United States Patent
McCulloch et al.

(10) Patent No.: US 9,873,357 B1
(45) Date of Patent: Jan. 23, 2018

(54) RECLINER MECHANISM

(71) Applicant: Lear Corporation, Southfield, MI (US)

(72) Inventors: Peter Robert McCulloch, Grosse Pointe Woods, MI (US); James S. Wawrzyniak, Warren, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/396,926

(22) Filed: Jan. 3, 2017

(51) Int. Cl.
*B60N 2/20* (2006.01)
*B60N 2/235* (2006.01)
*B60N 2/22* (2006.01)

(52) U.S. Cl.
CPC ............ *B60N 2/2358* (2013.01); *B60N 2/20* (2013.01); *B60N 2/2227* (2013.01); *B60N 2/2362* (2015.04)

(58) Field of Classification Search
CPC ...... B60N 2/20; B60N 2/2227; B60N 2/2358; B60N 2/2362
USPC ................................ 297/367 P, 367 L, 367 R
See application file for complete search history.

(56) References Cited

U.S. PATENT DOCUMENTS

| | | | |
|---|---|---|---|
| 3,953,069 A * | 4/1976 | Tamura | B60N 2/20 |
| | | | 297/367 R X |
| 3,958,828 A * | 5/1976 | Ishida | B60N 2/2218 |
| | | | 297/367 R X |
| 5,522,643 A * | 6/1996 | Matsuura | B60N 2/2354 |
| | | | 297/367 R |
| 6,007,153 A * | 12/1999 | Benoit | B60N 2/2358 |
| | | | 297/367 R X |
| 6,332,649 B1 | 12/2001 | Vossmann | |
| 6,561,585 B2 | 5/2003 | Cilliere et al. | |
| 6,634,713 B2 | 10/2003 | Nonomiya et al. | |
| 6,749,263 B2 | 6/2004 | Peters | |
| 7,014,265 B2 * | 3/2006 | Yamada | B60N 2/20 |
| | | | 297/367 R |
| 7,055,906 B2 | 6/2006 | Shinozaki | |
| 7,360,838 B2 | 4/2008 | Smuk | |
| 7,380,882 B2 | 6/2008 | Oki | |
| 7,380,883 B2 * | 6/2008 | Koumura | B60N 2/20 |
| | | | 297/367 R |
| 7,497,519 B2 | 3/2009 | Dill et al. | |
| 7,578,557 B2 | 8/2009 | Becker et al. | |
| 7,614,700 B2 | 11/2009 | Peters | |
| 7,648,205 B2 | 1/2010 | Zou et al. | |
| 7,677,667 B2 | 3/2010 | Peters et al. | |
| 7,828,386 B2 | 11/2010 | Reubeuze et al. | |
| 7,922,250 B2 | 4/2011 | Rohee | |
| 7,950,741 B2 | 5/2011 | Mitsuhashi | |
| 8,201,888 B2 | 6/2012 | Fassbender et al. | |
| 8,430,454 B2 | 4/2013 | Tanguy et al. | |
| 8,449,034 B2 * | 5/2013 | Tame | B60N 2/206 |
| | | | 297/367 R |
| 8,459,743 B2 | 6/2013 | Villarroel | |
| 8,585,149 B2 | 11/2013 | Villarroel et al. | |
| 8,616,648 B2 | 12/2013 | Holzhueter et al. | |
| 8,616,649 B2 | 12/2013 | Uramichi et al. | |

(Continued)

*Primary Examiner* — Rodney B White
(74) *Attorney, Agent, or Firm* — Brooks Kushman P.C.

(57) ABSTRACT

A recliner mechanism having the first plate, a second plate, at least one pawl, and a memory plate. The memory plate may be disposed between the first plate and the second plate and may be movable in an axial direction. The pawl may be held in a retracted position when the memory plate is actuated into engagement with the second plate.

20 Claims, 18 Drawing Sheets

(56) References Cited

U.S. PATENT DOCUMENTS

| | | | |
|---|---|---|---|
| 8,657,377 B2 * | 2/2014 | Barzen | B60N 2/20 |
| | | | 297/354.1 |
| 8,668,269 B2 | 3/2014 | Jaudouin et al. | |
| 8,672,407 B2 | 3/2014 | Leconte et al. | |
| 8,702,172 B2 | 4/2014 | Schmodde et al. | |
| 8,720,999 B2 | 5/2014 | Peters | |
| 8,746,796 B2 | 6/2014 | Wei | |
| 8,985,689 B2 | 3/2015 | McCulloch et al. | |
| 8,985,690 B2 * | 3/2015 | Yamada | B60N 2/2358 |
| | | | 297/367 L X |
| 2002/0096924 A1 * | 7/2002 | Reubeuze | B60N 2/2358 |
| | | | 297/367 R |
| 2008/0001458 A1 | 1/2008 | Hoshihara et al. | |
| 2008/0303331 A1 | 12/2008 | Heo | |
| 2010/0295352 A1 | 11/2010 | Flucht et al. | |
| 2011/0025114 A1 | 2/2011 | Berndtson et al. | |
| 2011/0127821 A1 | 6/2011 | Wojatzki et al. | |
| 2011/0254338 A1 | 10/2011 | Fisher, III et al. | |
| 2012/0169105 A1 | 7/2012 | Assmann et al. | |
| 2013/0187426 A1 | 7/2013 | Nagura et al. | |
| 2013/0214578 A1 | 8/2013 | Stilleke et al. | |
| 2013/0270883 A1 | 10/2013 | Becker et al. | |
| 2013/0300175 A1 | 11/2013 | Peters | |
| 2014/0077561 A1 | 3/2014 | Sasaki | |
| 2014/0210242 A1 | 7/2014 | Schueler et al. | |
| 2014/0225411 A1 | 8/2014 | Matt | |
| 2015/0321585 A1 | 11/2015 | McCulloch et al. | |

* cited by examiner

RECLINER MECHANISM

TECHNICAL FIELD

This patent application relates to a recliner mechanism that may be provided with a seat.

BACKGROUND

A vehicle seat and recliner memory module is disclosed in U.S. Patent Publication No. 2011/0127821.

SUMMARY

In at least one embodiment, a recliner mechanism is provided. The recliner mechanism may include a first plate, a second plate, a set of pawls, and a memory plate. The second plate may be rotatable about an axis with respect to the first plate. The second plate may have a set of teeth and a set of locking protrusions. The set of pawls may be movable between an extended position and a retracted position. The pawls may engage the teeth to inhibit rotation of the second plate with respect to the first plate when in the extended position. The pawls may be disengaged from the teeth to permit rotation of the second plate with respect to the first plate when in the retracted position. The memory plate may be disposed between the first plate and the second plate. The memory plate may be movable along the axis and may have a set of memory plate teeth. The memory plate may hold the pawls in the retracted position when the memory plate is actuated toward the second plate and the memory plate teeth engage the locking protrusions.

In at least one embodiment, a recliner mechanism is provided. The recliner mechanism may include a first plate, a second plate, a set of pawls, a memory plate, a hub, and a memory hub. The second plate may be rotatable about an axis with respect to the first plate. The second plate may have a set of teeth and a set of locking protrusions. The set of pawls may be movable between an extended position and a retracted position. The pawls may engage the teeth to inhibit rotation of the second plate with respect to the first plate when in the extended position. The pawls may not engage the teeth to permit rotation of the second plate with respect to the first plate when in the retracted position. The memory plate may be disposed between the first plate and the second plate. The memory plate may hold the pawls in the retracted position when the memory plate is actuated in an axial direction toward the second plate and into engagement with the locking protrusions. The hub may actuate the pawls. The memory hub may actuate the memory plate. The hub and the memory hub may be independently rotatable about the axis.

At least one embodiment, a recliner mechanism is provided. The recliner mechanism may include a first plate, a second plate, a pawl, and a memory plate. The second plate may be rotatable about an axis. The pawl may be disposed between the first plate and the second plate. The pawl may have a pawl pin that may extend toward the second plate. The pawl may be moveable in a radial direction between an extended position and a retracted position. The pawl may inhibit rotation of the second plate about the axis when in the extended position. The pawl may not engage the second plate and the second plate may be rotatable about the axis when the pawl is in the retracted position. The memory plate may have a first side that may face toward the first plate. A memory guide and a memory slot may be provided on the first side. The memory slot may extend from the memory guide. The pawl may be moveable between the retracted position and the extended position when the pawl pin is disposed in the memory slot. The pawl may be held in the retracted position when the pawl pin is received in the memory guide.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
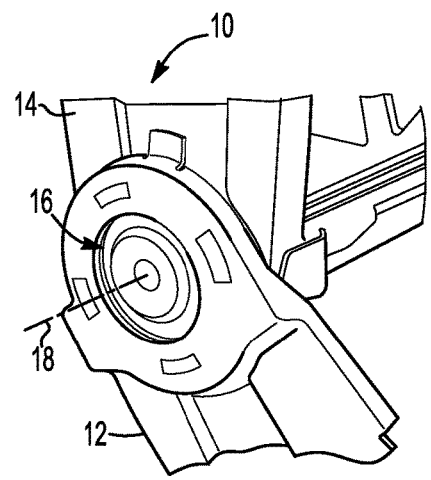
FIG. 1 is a perspective view of a portion of a seat assembly having a recliner mechanism.

Referring to FIG. 1, a portion of a seat assembly 10 is shown. The seat assembly 10 may have a seat bottom 12, a seat back 14, and a recliner mechanism 16.

Figure 2:
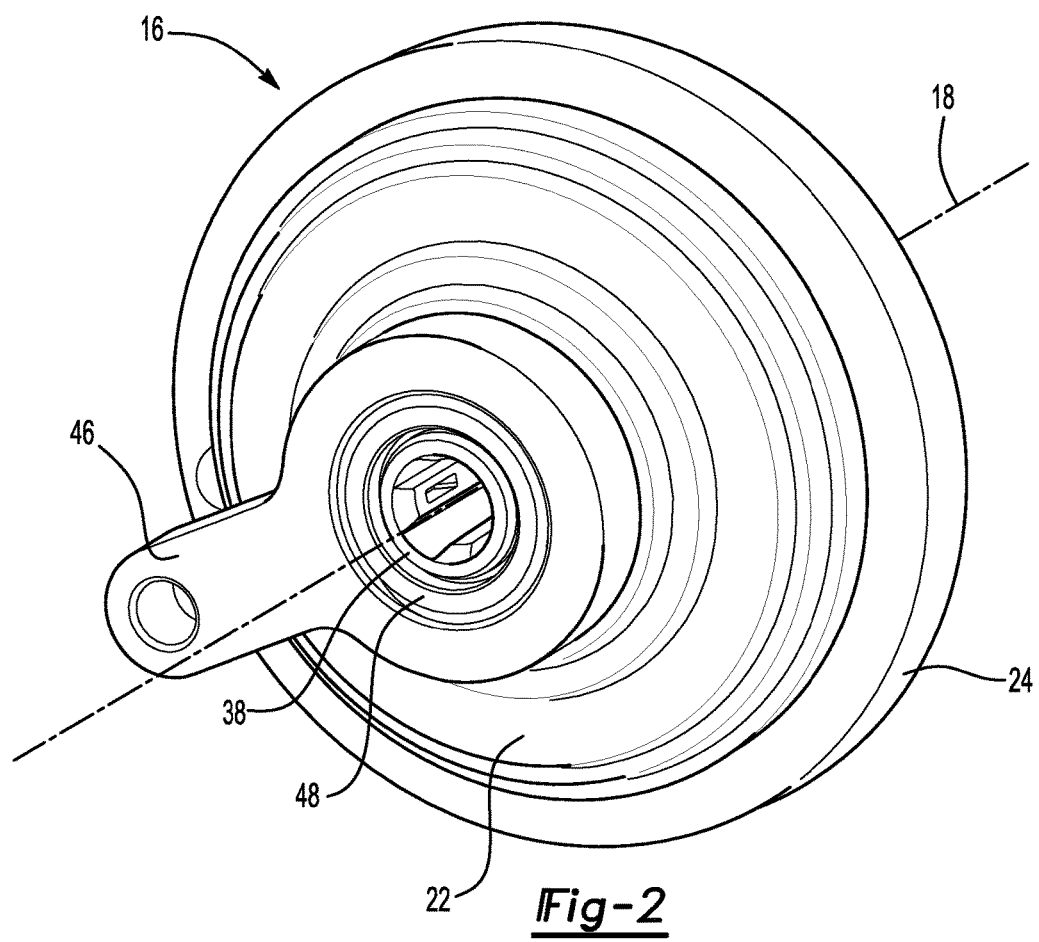
FIG. 2 is a perspective view of the recliner mechanism.
Figure 3:
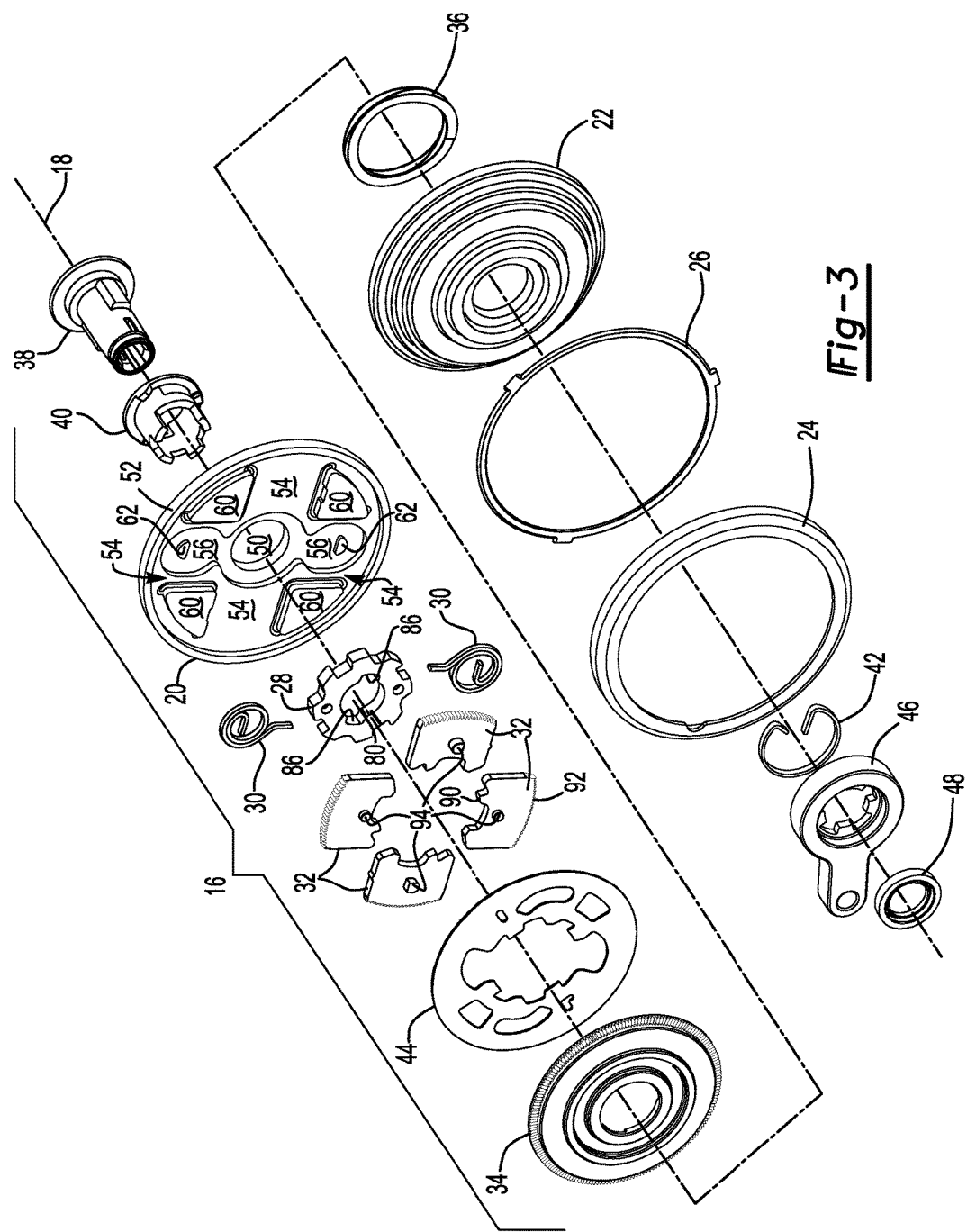
FIG. 3 is an exploded view of the recliner mechanism.
Figure 4:
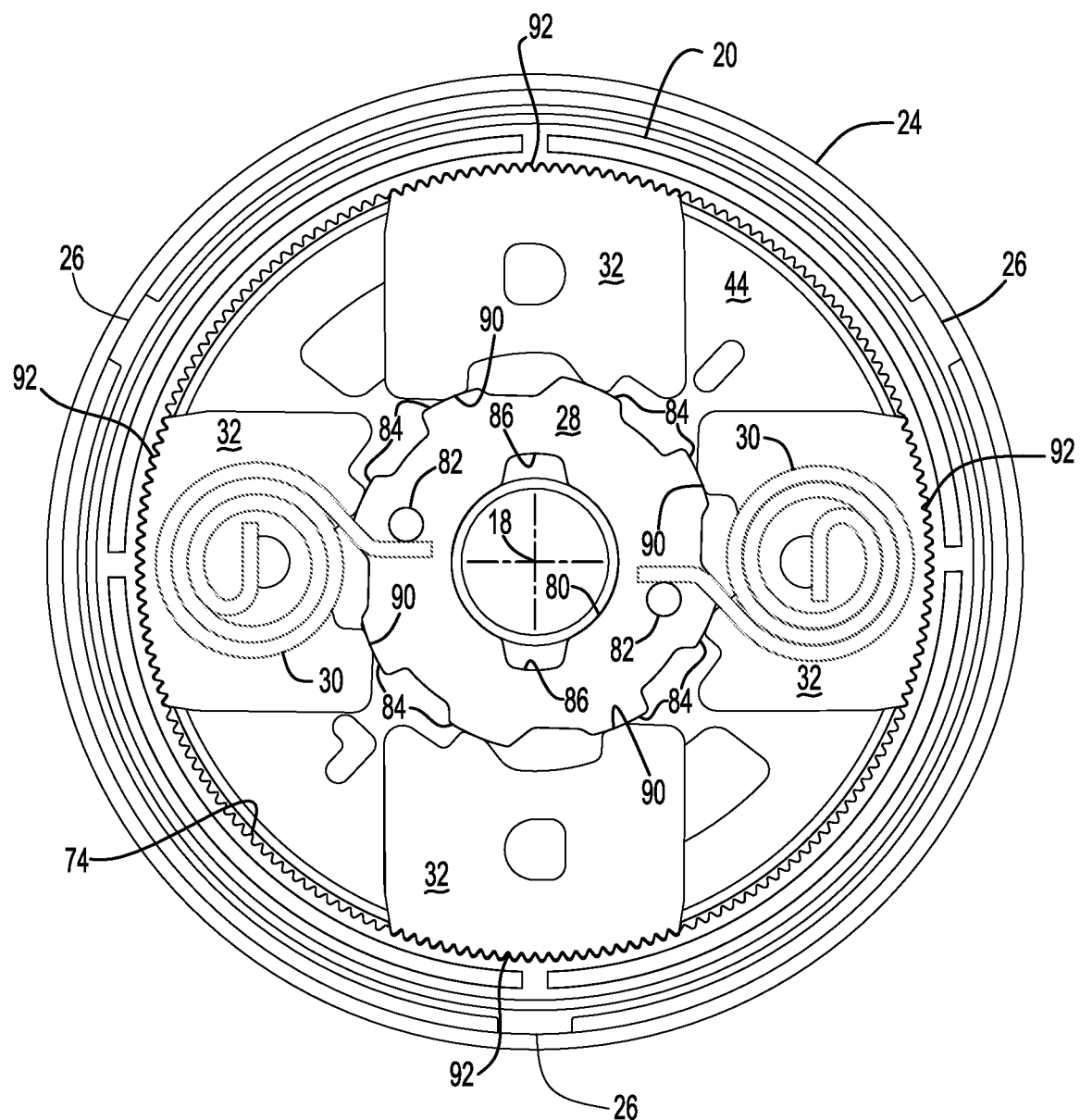
FIG. 4 is a side view of the recliner mechanism with a first plate and a hub of the recliner mechanism removed.

Referring to FIGS. 2-4, the recliner mechanism 16 is shown. The recliner mechanism 16 may be configured to control pivoting of the seat back 14 about an axis 18 with respect to the seat bottom 12. For example, the recliner mechanism 16 may facilitate pivoting of the seat back 14 between a folded position in which the seat back 14 may be generally positioned over the seat bottom 12 to a reclined position. One or more recliner mechanisms 16 may be provided with the seat assembly 10. For example, a pair of recliner mechanisms 16 may be disposed along opposing lateral sides of the seat back 14 to selectively permit or inhibit pivoting of the seat back 14. A torsion rod or synchronization rod may interconnect the recliner mechanisms and facilitate or synchronize operation of the recliner mechanisms. The recliner mechanism 16 may generally have a disc shape.

As is best shown in FIG. 3, the recliner mechanism 16 may include a first plate 20, a second plate 22, a retainer ring 24, a glide 26, a cam 28, one or more cam springs 30, a set of pawls 32, a memory plate 34, a memory plate biasing member 36, a hub 38, a memory hub 40, a return spring 42, a cam disc 44, a handle 46, and a clip 48.

Referring to FIG. 3, the first plate 20, which may also be called a guide plate, may be fixedly positioned on or with respect to a seat bottom 12. For example, the first plate 20 may be coupled to a structural member of the seat bottom 12 such as a seat bottom frame. For instance, the first plate 20 may be mounted to a recliner mounting bracket that may be fixedly disposed on or provided with a seat bottom frame. In at least one embodiment, the first plate 20 may be generally configured as a circular disc and may include a center hole 50, an outer surface 52, a set of pawl slots 54, and a set of cam spring slots 56.

The center hole 50 may be disposed proximate the center of the first plate 20. The center hole 50 may be radially disposed around the axis 18.

The outer surface 52 may be disposed opposite the center hole 50 and may face toward and may engage the retainer ring 24. In at least one embodiment, the outer surface 52 or a portion thereof may be radially disposed with respect to the axis 18 and may at least partially define an outside circumference of the first plate 20.

The set of pawl slots 54 may be provided in a side of the first plate 20 that faces toward the second plate 22. The pawl slots 54 may be spaced apart from each other and may be located between one or more guide blocks 60 that may extend from the first plate 20 toward the second plate 22. In FIG. 3, four pawl slots 54 and four guide blocks 60 are shown, although it is contemplated that a different number of pawl slots 54 and guide blocks 60 may be provided. Each pawl slot 54 may be configured to receive and guide movement of a corresponding pawl 32. The pawl slots 54 may be disposed between the center hole 50 and the outer surface 52 and may extend in a radial direction with respect to the axis 18.

The set of cam spring slots 56 may be disposed adjacent to one or more of the pawl slots 54. For example, a cam spring slot 56 may be configured as a recess that may be disposed in the first plate 20 such that a pawl 32 is axially positioned between the second plate 22 and a cam spring slot 56. In FIG. 3, two cam spring slots 56 are shown, although it is contemplated that a different number of cam spring slots 56 may be provided. The cam spring slots 56 may extend from the center hole 50 toward the outer surface 52. A cam spring slot 56 may receive and position a cam spring 30 that may exert a biasing force on the cam 28 to bias the pawls 32 outwardly or away from the axis 18. A cam spring slot 56 may include a cam spring engagement feature 62 may facilitate mounting or coupling of the cam spring 30 to the first plate 20. For instance, the cam spring engagement feature 62 may be configured as a protrusion that may extend toward the second plate 22. It is also contemplated that the cam spring engagement feature 62 may be configured as a recess that may receive a portion or end of the cam spring 30.

Figure 5:
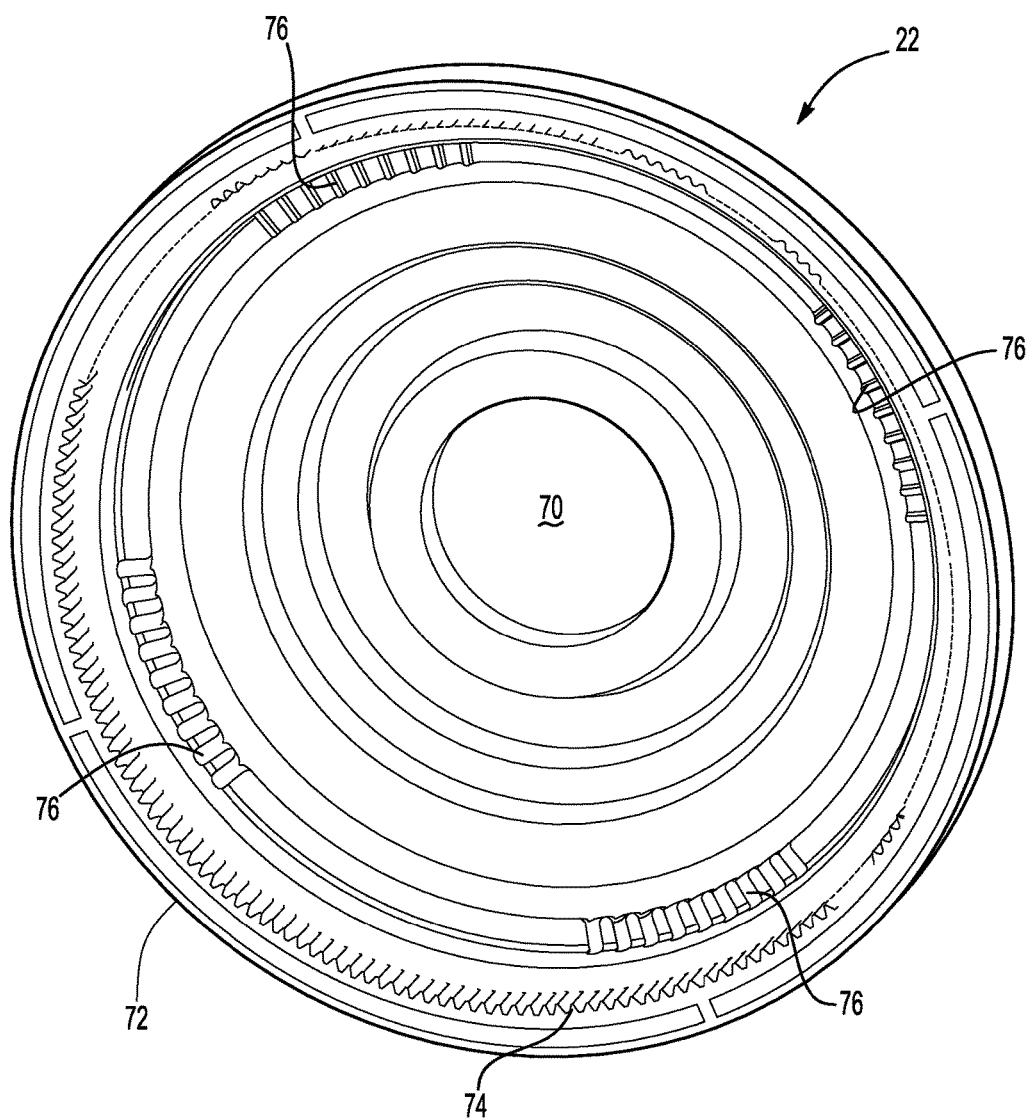
FIG. 5 is a perspective view of a second plate of the recliner mechanism.

Referring to FIGS. 3 and 5, the second plate 22 may be configured to be coupled to the seat back 14. For example, the second plate 22 may be coupled to a side member of a seat back frame or may be fixedly disposed on a recliner mounting bracket that may be coupled to the seat back frame. As such, the second plate 22 may rotate with the seat back 14 about the axis 18 with respect to the first plate 20. As such, reference to rotation of the seat back 14 may also refer to rotation of the second plate 22 with respect to the first plate 20. The second plate 22 may include a center hole 70, an outer ring 72, a set of teeth 74, and a set of locking protrusions 76.

Referring to FIG. 5, the center hole 70 may be disposed proximate the center of the second plate 22. The center hole 70 may be radially disposed around the axis 18.

The outer ring 72 may extend around the axis 18 and may define an outside surface or outside circumference of the second plate 22. For example, the outer ring 72 may extend continuously around the axis 18. The outer ring 72 may also engage the glide 26 and may be separated or spaced apart from the retainer ring 24 by the glide 26 in one or more embodiments.

The set of teeth 74 may be disposed on the outer ring 72. For instance, the teeth 74 may extend from an interior surface or interior side of the outer ring 72 toward the axis 18. As such, the peak of each member of the set of teeth 74 may be disposed closer to the axis 18 than a trough located between adjacent teeth 74. In addition, the teeth 74 may extend from an end surface of the second plate 22 that may engage the first plate 20 in a direction that extends away from the first plate 20. As such, the set of teeth 74 may extend generally parallel to the axis 18. The teeth 74 may be spaced apart from each other and provided in repeating arrangement around the axis 18. In FIG. 5, not all of the teeth 74 are shown for clarity, but are represented by the dashed line segments that extend between separate groupings of teeth 74.

The set of locking protrusions 76 may be radially positioned between the axis 18 and the set of teeth 74. For instance, the locking protrusions 76 may be generally disposed between the center hole 70 and the outer ring 72 such that the locking protrusions 76 may be spaced apart from the set of teeth 74. The locking protrusions 76 may be axially offset from the outer ring 72 and the set of teeth 74. For example, the locking protrusions 76 may be disposed further away from the first plate 20 than at least a portion of the outer ring 72 and the set of teeth 74. The locking protrusions 76 may extend generally perpendicular to the axis 18 and the teeth 74. The locking protrusions 76 may be spaced apart from each other and may be provided in a repeating pattern. In the configuration shown in FIG. 5, the locking protrusions 76 are arranged in four groups that are spaced apart from each other and are positioned around the axis 18 at intervals of approximately 90°.

Referring to FIGS. 2 and 3, the retainer ring 24 may couple the first plate 20 to the second plate 22. More specifically, the retainer ring 24 may be fixedly secured to the first plate 20 but may not be fixedly secured to or fixedly clamped onto the second plate 22. As such, the second plate 22 and memory plate 34 may be received inside the retainer ring 24 such that axial movement of the second plate 22 is inhibited while rotational movement of the second plate 22 and memory plate 34 with respect to the retainer ring 24 and first plate 20 may be permitted.

Referring to FIGS. 3 and 4, the glide 26 may be located between the retainer ring 24 and the second plate 22. The glide 26 may act as a spacer that may separate the second plate 22 from the retainer ring 24. The glide 26 may be configured as a ring and may be made of a polymeric material like nylon. In at least one configuration, the glide 26 may include a plurality of tabs that may extend away from the axis 18 and that may engage an inner surface or inside circumference of the retainer ring 24 to help radially position the glide 26.

Referring to FIGS. 3 and 4, the cam 28 may facilitate actuation of the set of pawls 32. The cam 28 may be axially disposed between the first plate 20 and the memory plate 34 and may be configured to rotate about the axis 18. The cam 28 may include a center hole 80, one or more cam pins 82, and a plurality of cam lobes 84.

The center hole 80 may be disposed around the axis 18. The center hole 80 may generally have a keyed shape that may include a pair of cam hole recesses 86. The cam hole recesses 86 may extend away from the axis 18 and may receive corresponding engagement features of the hub 38 as will be discussed in more detail below.

The cam pins 82 may extend from a side of the cam 28 toward the first plate 20. In addition, each cam pin 82 may be disposed between the center hole 80 and a cam lobe 84. Each cam pin 82 may engage a corresponding cam spring 30 that may bias the cam 28 to rotate in a manner that actuates the set of pawls 32 away from the axis 18.

The cam lobes 84 may be provided around the periphery of the cam 28. In FIG. 4, eight cam lobes 84 are shown, although a different number of cam lobes may be provided. The cam lobes 84 may be disposed opposite the center hole 80 and may extend away from the axis 18. The cam lobes 84 may engage and mate with the cam disc 44 such that the cam disc 44 does not rotate with respect to the cam 28. As such, rotation of the cam 28 may rotate the cam disc 44, which in turn may actuate the set of pawls 32 as will be discussed in more detail below.

Referring to FIGS. 3 and 4, an example of a cam spring 30 is shown. The cam spring 30 may be received in a corresponding cam spring slot 56 of the first plate 20. The cam spring 30 may extend between a cam spring engagement feature 62 of the first plate 20 and a cam pin 82 of the cam 28. For example, a first end of the cam spring 30 may be disposed proximate and may engage a cam spring engagement feature 62 while a second end of the cam spring 30 may engage a cam pin 82. The cam spring 30 may exert a biasing force on the cam 28 that may bias the cam 28 to rotate about the axis 18 in a direction that urges or actuates the pawls 32 away from the axis 18 toward an extended position.

Referring to FIGS. 3 and 4, the set of pawls 32 may be arranged around the cam 28. Each pawl 32 may be axially disposed between the first plate 20 and the cam disc 44 and may be received in a corresponding pawl slot 54 of the first plate 20. As such, the pawls 32 may be coplanar with each other and may be disposed in a common plane with the cam 28 that may extend substantially perpendicular to the axis 18. The pawls 32 may selectively engage the set of teeth 74 as will be discussed in more detail below. The pawls 32 may have a cam following edge 90, an externally toothed edge 92, and a pawl pin 94.

The cam following edge 90 may face toward and may engage the cam 28. The cam following edge 90 may be shaped to cooperate with the cam lobes 84 of the cam 28 to permit the pawls 32 to move in a radial direction or in a generally linear manner away from the axis 18 from a retracted position to an extended position as will be more fully described below.

The externally toothed edge 92 may be disposed opposite the cam following edge 90. The externally toothed edge 92 may have a set of teeth that may face toward the set of teeth 74 of the second plate 22. The teeth of the externally toothed edge 92 may mate with and may engage the teeth 74 when the pawls 32 are in the extended position to inhibit or prevent rotation of the second plate 22 about the axis 18 with respect to the first plate 20.

Figure 10A:
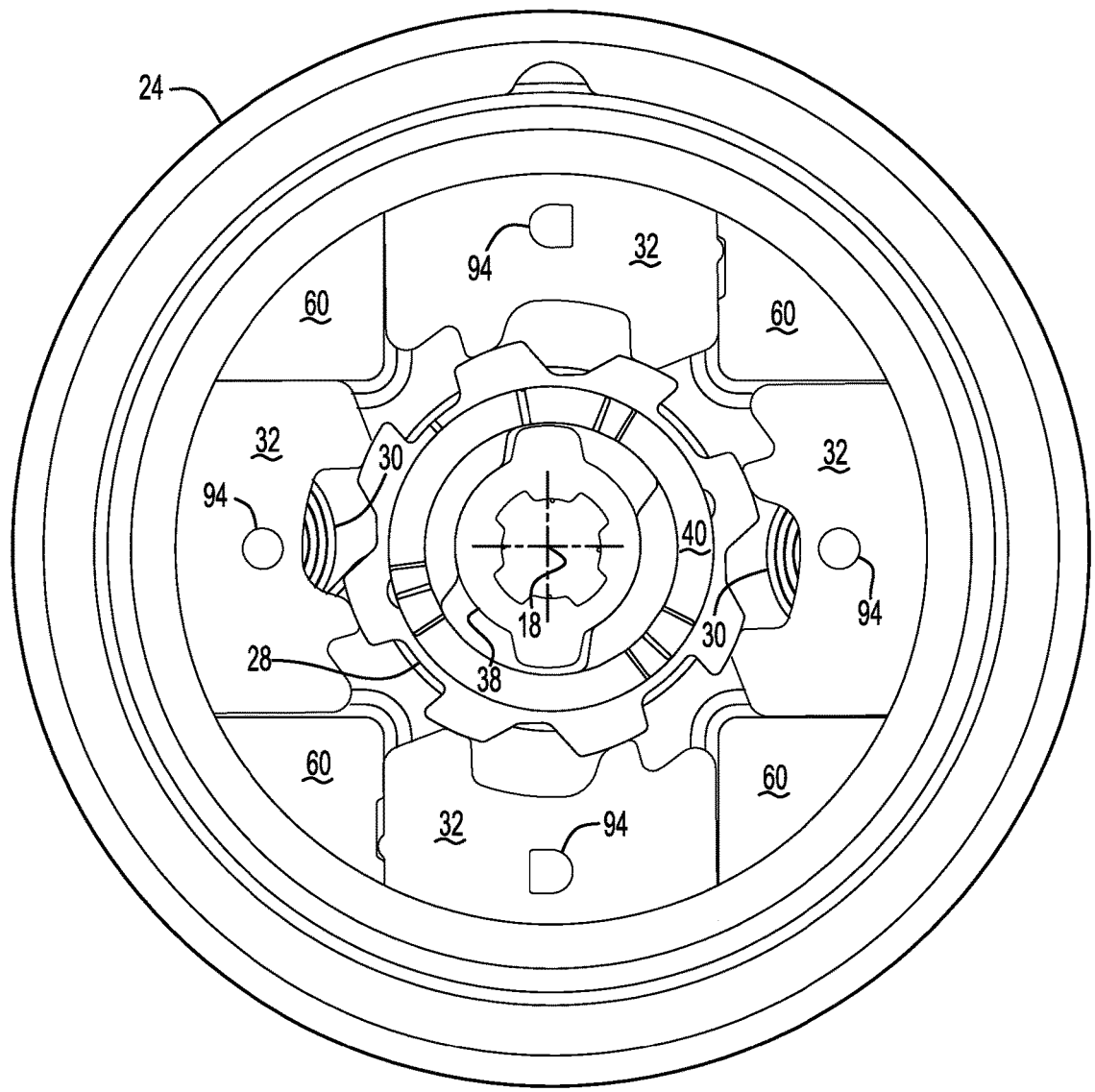
FIGS. 10A-10D show the recliner mechanism in an initial position with the pawls of the recliner mechanism in an extended position and the memory plate in an unlocked position.

Referring to FIGS. 2 and 10A, the pawl pin 94 may extend away from the first plate 20 and toward the memory plate 34. For example, the pawl pin 94 may extend through a corresponding opening in the cam disc 44 and may be received in the memory plate 34 as will be discussed in more detail below. The pawl pins 94 may be provided with different shapes. For instance, the pawl pin 94 that is provided on a pawl 32 that may be disposed adjacent to a cam spring 30 may be provided with a generally cylindrical shape. The pawl pin 94 that is provided on a pawl 32 that is not disposed adjacent to a cam spring 30 may be provided with another shape, such as a generally D-shaped shape.

Figure 6:
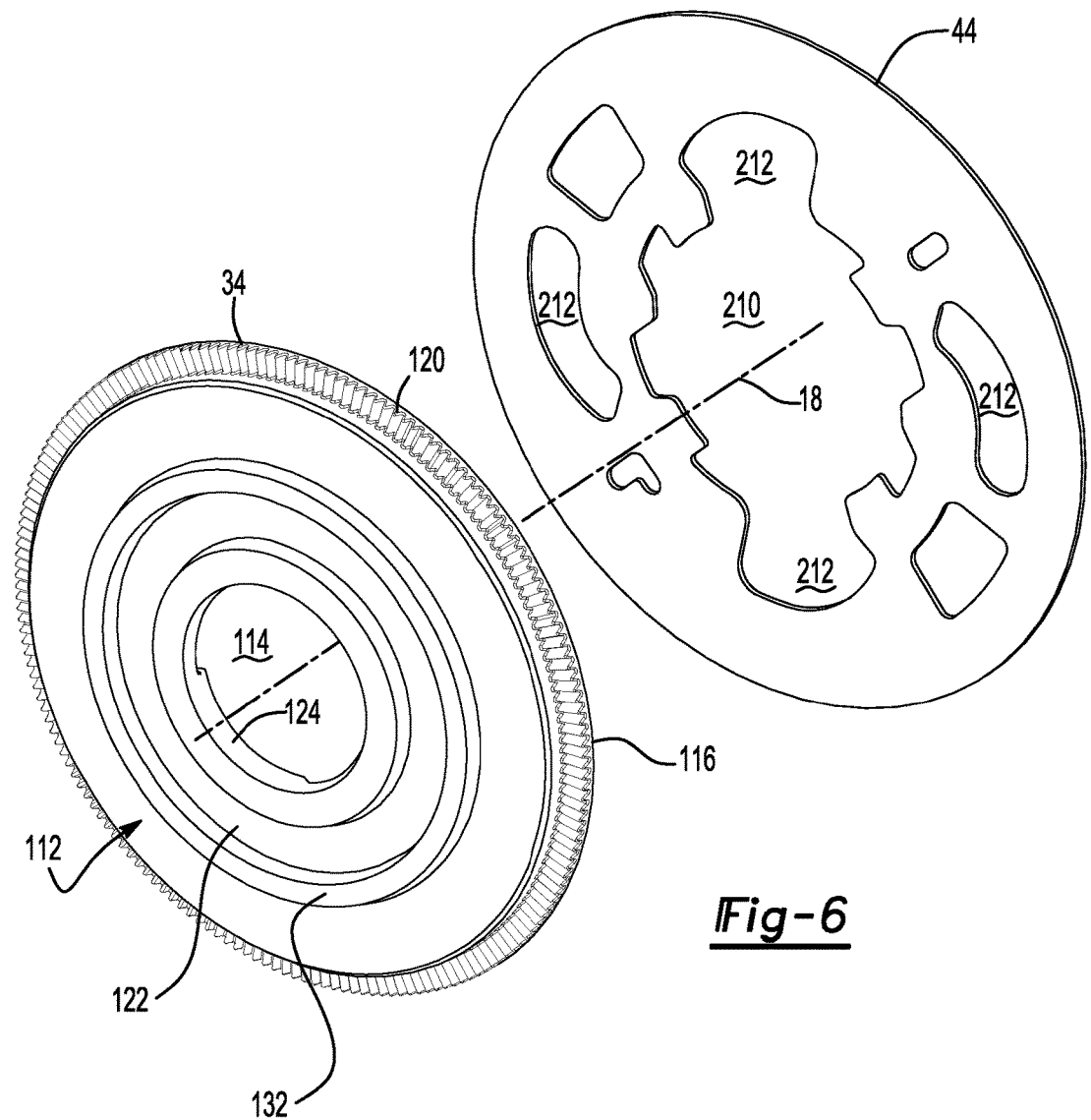
FIGS. 6 and 7 are perspective views of a memory plate and a cam disc of the recliner mechanism.
Figure 7:
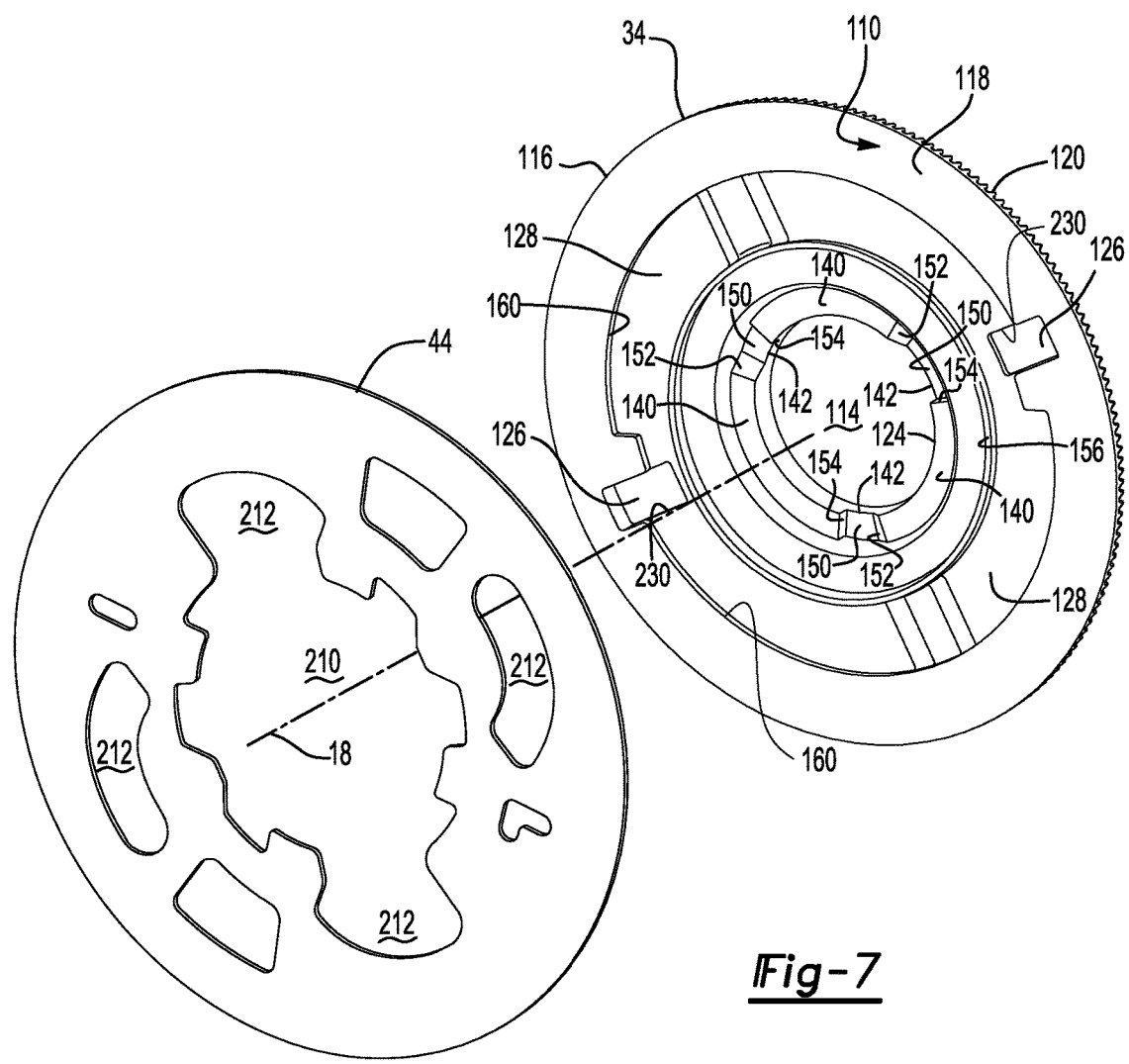

Referring to FIGS. 3, 6 and 7, the memory plate 34 may be received inside the second plate 22. The memory plate 34 may be axially positioned between the first plate 20 and the second plate 22. More specifically, the memory plate 34 may be axially positioned between the cam disc 44 and the second plate 22. The memory plate 34 may be moveable in an axial direction or along the axis 18 as will be discussed in more detail below. As is best shown with reference to FIGS. 6 and 7, the memory plate 34 may be generally configured as a circular disc and may include a first side 110, a second side 112, a center hole 114, an outer surface 116, an outer ring 118, a set of memory plate teeth 120, a retention groove 122, a center ring 124, at least one memory slot 126, and at least one memory guide 128.

Referring to FIG. 7, the first side 110 may face toward the first plate 20 and the cam disc 44. At least one memory slot 126 and at least one memory guide 128 may be provided on the first side 110.

Referring to FIG. 6, the second side 112 may be disposed opposite the first side 110. As such, the second side 112 may face toward the second plate 22. The set of memory plate teeth 120 and the retention groove 122 may be provided on the second side 112.

The center hole 114 may be disposed proximate the center of the memory plate 34. The center hole 114 may be a through hole that may extend from the first side 110 to the second side 112. The center hole 114 may have substantially the same size and shape as the center hole 70 of the first plate 20 in the center hole 114 of the second plate 22.

The outer surface 116 may be disposed opposite the center hole 114 and may face away from the axis 18. The outer surface 116 may at least partially define an outside circumference of the memory plate 34 and the outer ring 118.

Referring to FIG. 7, the outer ring 118 may extend from the outer surface 116 toward the center hole 114. For example the outer ring 118 may extend from the outer surface 116 toward or to the memory slots 126 and the memory guide 128. The outer ring 118 may include one or more stops 130. A stop 130 may be disposed adjacent to a memory slot 126 and may extend inward toward the axis 18 and into the memory guide 128. The stop 130 may inhibit rotation of the memory plate 34 with respect to the first plate 20 when a pawl pin 94 engages the stop 130.

Referring to FIG. 6, the set of memory plate teeth 120 may be configured to engage the locking protrusions 76. The memory plate teeth 120 may be disposed on the second side 112 of the outer ring 118. The memory plate teeth 120 may extend from the outer surface 116 toward the center hole 114. As such, the memory plate teeth 120 may be radially disposed with respect to the axis 18. In addition, the memory plate teeth 120 may be arranged in a continuous or repeating manner around the perimeter of the memory plate 34.

The memory plate 34 may be movable along the axis 18 between an unlocked position and a locked position. In the unlocked position, the memory plate teeth 120 may be disengaged from the locking protrusions 76 of the second plate 22. The second plate 22 may rotate about the axis 18 with respect to the memory plate 34 when in the unlocked position. In the locked position, the memory plate teeth 120 may engage and mate with the locking protrusions 76 of the second plate 22. The memory plate 34 may not rotate with respect to the second plate 22 when the memory plate 34 is in the locked position. As such, the memory plate 34 may rotate about the axis 18 with the second plate 22 when the memory plate 34 is in the locked position.

Referring to FIG. 6, the retention groove 122 may receive and help position the memory plate biasing member 36. The retention groove 122 may be configured as a ring that may extend around the center ring 124. Optionally, an intermediate ring 132 may be concentrically disposed with the center ring 124. The intermediate ring 132 may extend around the center ring 124 and may cooperate with the center ring 124 to define the retention groove 122. As such, the retention groove 122 may be disposed between the center ring 124 and the intermediate ring 132 in one or more embodiments.

Referring to FIG. 7, the center ring 124 may extend around the center hole 114 and may at least partially define the center hole 114. The center ring 124 may have a face 140 and one or more recesses 142.

The face 140 may be disposed on the first side 110. The face 140 may extend away from the axis 18 from the center hole 114. The face 140 may be disposed substantially perpendicular to the axis 18 in one or more embodiments. One or more wedges on the memory hub 40 may engage the face 140 when the memory plate 34 is in the locked position as will be discussed in more detail below.

One or more recesses 142 may extend from the face 140 toward the second side 112. In FIG. 7, three recesses 142 are shown, although it is contemplated that a different number of recesses 142 may be provided. The recesses 142 may be spaced apart from each other and may extend from the center hole 114 in a direction that extends away from the axis 18. Each recess 142 may receive a corresponding wedge on the memory hub 40 when the memory plate 34 is in the unlocked position as will be discussed in more detail below. Each recess 142 may have a bottom recess surface 150, a recess ramp surface 152, and a recess side surface 154.

The bottom recess surface 150 may extend from the center hole 114 and may be disposed at the bottom of the recess 142. As such, the bottom recess surface 150 may be axially positioned closer to the second plate 22 than the first plate 20. The bottom recess surface 150 may be disposed substantially perpendicular to the axis 18 and may be disposed substantially parallel to the face 140 in one or more embodiments.

The recess ramp surface 152 may extend from the face 140 to the bottom recess surface 150. In addition, the recess ramp surface 152 may extend from the center hole 114 in a direction that extends away from the axis 18. The recess ramp surface 152 may be disposed at an angle with respect to the face 140 and the bottom recess surface 150. More specifically, the recess ramp surface 152 may be disposed in a non-perpendicular relationship with the face 140 and the bottom recess surface 150 to permit a wedge on the memory hub 40 to slide up or down the recess ramp surface 152 in response to rotation of the memory hub 40. As an example, the recess ramp surface 152 may be disposed at an angle of between 30° to 60° with respect to the face 140 and the bottom recess surface 150.

The recess side surface 154 may be disposed opposite the recess ramp surface 152. The recess side surface 154 may extend from face 140 to the bottom recess surface 150. The recess side surface 154 may be disposed in a nonparallel relationship with the recess ramp surface 152. For example, the recess side surface may be disposed substantially perpendicular to the face 140 and/or the bottom recess surface 150.

At least one memory slot 126 may be provided in the first side 110. The memory slot 126 may receive a corresponding pawl pin 94 when the memory plate 34 is in an unlocked position as will be discussed in more detail below. In FIG. 7, two memory slots 126 are shown that are disposed directly opposite each other. The memory slots 126 may be radially positioned between the outer surface 116 and the center ring 124. For example, the memory slots 126 may extend radially with respect to the axis 18 and may be positioned between and may be spaced apart from the outer surface 116 and a support ring 156 that may help support the cam disc 44. The memory slots 126 may have a generally rectangular shape in one or more embodiments. The memory slots 126 may have a greater depth in an axial direction or may have a bottom that may be disposed closer to the second plate 22 than the bottom of the memory guide 128. As such, a bottom surface of the memory slot 126 may be disposed further from the cam disc 44 than the bottom surface of the memory guide 128.

At least one memory guide 128 may be disposed adjacent to the memory slot 126. In FIG. 7, a single memory guide 128 is shown that extends continuously around the axis 18; however, it is contemplated that separate memory guides 128 may be provided that extend from a corresponding memory slot 126. The memory guide 128 may be disposed opposite the intermediate ring 132 and may be configured as a recess or groove that may be disposed between the outer surface 116 and the support ring 156. In the configuration shown, the memory guide 128 extends from the support ring 156 to a memory guide wall 160. The memory guide wall 160 may be disposed radially outward from the support ring 156 and may be positioned between the support ring 156 and the outer surface 116. At least a portion of the memory guide wall 160 may be disposed at a constant radial distance from the axis 18.

The memory guide 128 may have a depth that is less than the depth of the memory slot 126. As such, the bottom surface the memory guide 128 may be disposed closer to the cam disc 44 than the bottom surface of the memory slot 126. Due to the depth differences between the memory slot 126 and the memory guide 128, a pawl pin 94 may be inhibited from moving from the memory slot 126 into the memory guide 128 when the memory plate 34 is in the unlocked position. Conversely, a pawl pin 94 may move between the memory slot 126 and the memory guide 128 when the memory plate 34 is in the locked position. A pawl 32 may be held in the retracted position when one or more pawl pins 94 engage the memory guide wall 160 as will be discussed in more detail below.

Referring to FIG. 3, the memory plate biasing member 36 may be axially positioned between the second plate 22 and the memory plate 34. The memory plate biasing member 36 may exert a biasing force on the memory plate 34 that may bias the memory plate 34 toward the first plate 20. The memory plate biasing member 36 may have any suitable configuration. For instance, the memory plate biasing member 36 may be configured as a coil spring or wave washer and may extend around the axis 18 in one or more embodiments. In at least one configuration, the memory plate biasing member 36 may be received in the retention groove 122 of the memory plate 34 and may extend continuously around the axis 18.

Figure 8:
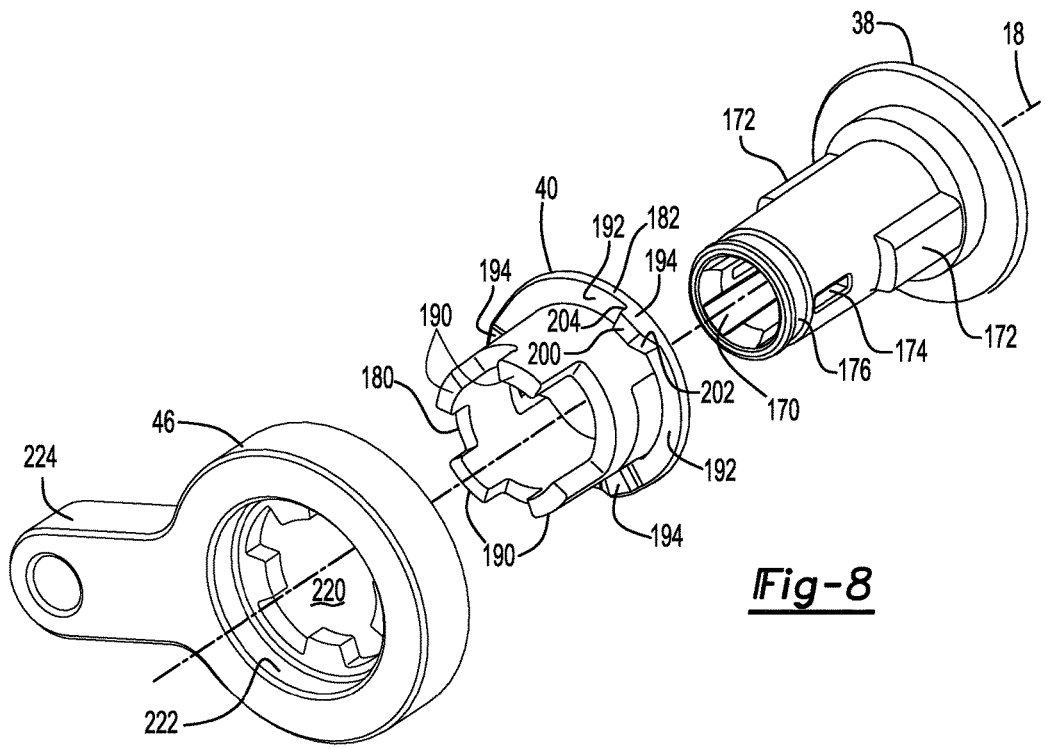
FIGS. 8 and 9 are exploded perspective views of a handle, a memory hub, and the hub of the recliner mechanism.
Figure 9:
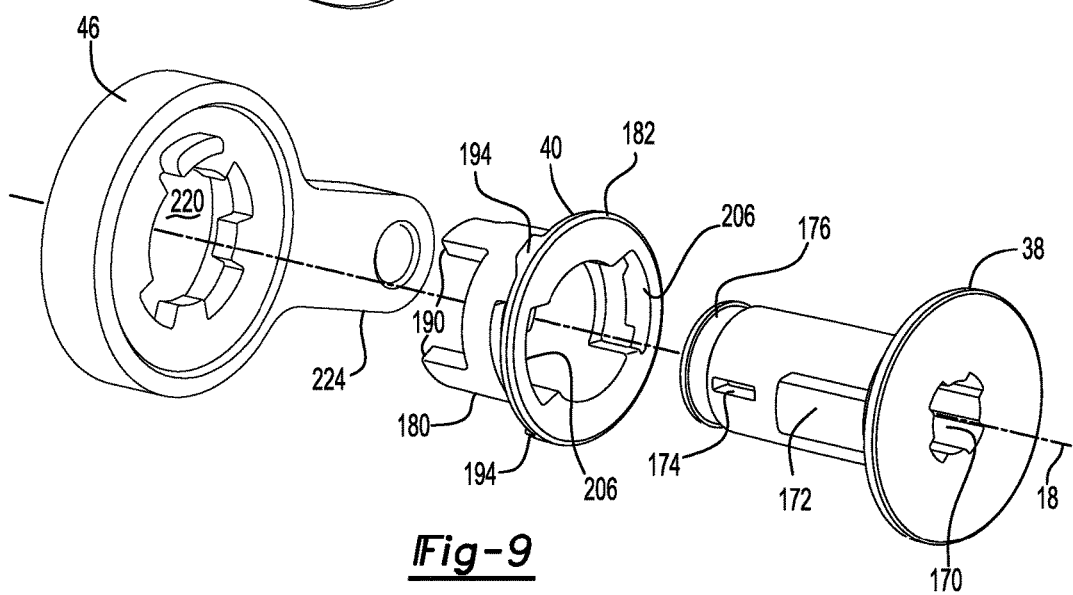

Referring to FIGS. 3, 8 and 9, the hub 38 may be configured to help control actuation of the recliner mechanism 16. The hub 38 may extend around the axis 18 and may extend through recliner mechanism 16. For instance, the hub 38 may extend through the center holes of the first plate 20, the second plate 22, the cam 28, the memory plate 34, the memory hub 40, the cam disc 44 and the clip 48. The hub 38 may be configured to rotate about the axis 18. Rotation of the hub 38 may actuate the set of pawls 32. More specifically, the hub 38 may actuate the pawls 32 to control the angular inclination and recline functions of the recliner mechanism 16 while the memory hub 40 may separately control the memory function of the recliner mechanism 16 as will be discussed in more detail below. In at least one configuration, the hub 38 may include a hub hole 170, one or more engagement features 172, a return spring retaining feature 174, and a clip retaining feature 176.

Referring to FIGS. 8 and 9, the hub hole 170 may extend through the hub 38 and may extend around the axis 18. The hub hole 170 may be configured to receive a torsion rod or synchronization rod that may interconnect recliner mechanisms disposed on opposite lateral sides of the seat assembly 10. The hub hole 170 may also facilitate connection of an actuator or lever that may rotate the hub 38 about the axis 18.

One or more engagement features 172 may be operatively connected to the cam 28. For instance, one or more engagement features 172 may extend through the center hole 114 of the cam 28. In FIGS. 8 and 9, a pair of engagement features 172 are shown that may be disposed opposite each other and that may extend from an external surface of the hub 38 that may be disposed opposite the hub hole 170. The engagement features 172 may extend away from the axis 18. Each engagement feature 172 may be received in a corresponding cam hole recess 86. The engagement features 172 may be axially positioned inside the recliner mechanism 16 between the first plate 20 and the second plate 22.

The return spring retaining feature 174 may be operatively connected to the return spring 42. In the configuration shown, the return spring retaining feature 174 is configured as an indentation that may receive an end of the return spring 42. The return spring retaining feature 174 may be axially positioned between the engagement features 172 and of the clip retaining feature 176.

The clip retaining feature 176 may be disposed proximate an end of the hub 38. The clip retaining feature 176 may be configured to retain and secure the clip 48. In at least one configuration, the clip retaining feature 176 may be configured as an annular groove that may receive the clip 48. The clip retaining feature 176 may be axially positioned outside of the first plate 20 and the second plate 22 and inside the handle 46 in one or more embodiments.

Referring to FIGS. 3, 8 and 9, the memory hub 40 may be configured to help control seat back dump functionality of the recliner mechanism 16. The memory hub 40 may extend around the axis 18 and may partially extend through recliner mechanism 16. For instance, the memory hub 40 may be axially positioned between the cam 28 and the clip 48 and may extend through the center holes of the second plate 22 and the memory plate 34. The memory hub 40 may be configured to rotate about the axis 18 independently of the hub 38. Rotation of the memory hub 40 may actuate the memory plate 34. More specifically, the memory hub 40 may rotate in a first direction may actuate the memory plate 34 into engagement with the second plate 22 and may rotate in a second direction to permit the memory plate 34 to disengage the second plate 22. In at least one configuration, the memory hub 40 may include a tubular body 180 and a flange 182.

Referring to FIGS. 8 and 9, the tubular body 180 may extend around the axis 18 and the hub 38. In addition, the tubular body 180 may extend through the second plate 22, the memory plate 34, and the return spring 42. The tubular body 180 may define a hole that receives the hub 38. The tubular body 180 may have one or more tabs 190 that may be disposed at an end of the tubular body 180 that is disposed opposite the flange 182. The tabs 190 may facilitate mounting of the handle 44 as will be discussed in more detail below.

The flange 182 may be disposed at an end of the tubular body 180 that may be disposed opposite the tabs 190. The flange 182 may extend away from the axis 18 and may be axially positioned between the memory plate 34 and the cam disc 44. The flange 182 may include a rim face 192 and one or more wedges 194.

The rim face 192 may face toward the center ring 124 of the memory hub 40. The rim face 192 may engage the center ring 124 when the memory plate 34 is in the unlocked position and may be spaced apart from the center ring 124 when the memory plate 34 is in the locked position. The rim face 192 may extend between the wedges 194 and may be disposed substantially perpendicular to the axis 18 in one or more embodiments.

The wedges 194 may facilitate actuation of the memory plate 34 toward the second plate 22. In the configuration shown, three wedges 194 are provided that are spaced apart from each other and arranged around the axis 18; however, it is contemplated that a different number of wedges 194 may be provided. The wedges 194 may extend from the rim face 192 toward the memory plate 34. Each wedge 194 may be received in a corresponding recess 142 on the memory plate 34 when the memory plate 34 is in the unlocked position and may not be received in a corresponding recess 142 when the memory plate 34 is in the locked position. Each wedge 194 may have a wedge face surface 200, a wedge ramp surface 202, and a wedge side surface 204.

The wedge face surface 200 may face toward and may engage the memory plate 34. The wedge face surface 200 may be disposed substantially parallel to the bottom recess surface 150 and may be disposed substantially perpendicular to the axis 18. The wedge face surface 200 may engage the bottom recess surface 150 when the memory plate 34 is in the unlocked position and may engage the rim face 192 when the memory plate 34 is in the locked position.

The wedge ramp surface 202 may extend from the rim face 192 to the wedge face surface 200. In addition the wedge ramp surface 202 may be disposed substantially parallel to the recess ramp surface 152. As such, the wedge ramp surface 202 may be disposed in a non-perpendicular relationship with the rim face 192 and the wedge face surface 200 to permit the wedge 194 to slide along the recess ramp surface 152 in response to rotation of the memory hub 40.

The wedge side surface 204 may be disposed opposite the wedge ramp surface 202. The wedge side surface 204 may extend from the rim face 192 to the wedge face surface 200. The wedge side surface 204 may be disposed substantially parallel to the recess side surface 154 and in a nonparallel relationship with the wedge ramp surface 202.

Referring to FIG. 9, the tubular body 180 and the flange 182 may cooperate to define one or more receiving features 206. In the configuration shown, two receiving features 206 are provided that are disposed opposite each other. Each receiving feature 206 may be configured as an opening that may extend axially through the flange 182 and into the tubular body 180 and radially outward into the flange 182.

Each receiving feature 206 may receive a corresponding engagement feature 172 of the hub 38. Moreover, the receiving features 206 may be configured to permit the memory hub 40 rotate about the axis 18 with respect to the hub 38 and the engagement features 172 over a predetermined angular distance.

Referring to FIG. 3, the return spring 42 may interconnect the hub 38 and the memory hub 40. The return spring 42 may be axially positioned between the second plate 22 and the handle 46 and may extend at least partially around the memory hub 40. The return spring 42 may have a first end and a second end. The first end may be coupled to the hub 38. For example, the first end may engage the return spring retaining feature 174. The second end may be disposed opposite the first end and may be coupled to the memory hub 40. For instance, the second end may engage a tab 190 on the memory hub 40. In at least one configuration, the first end and the second end of the return spring 42 may extend toward the axis 18 and may be disposed between adjacent tabs 190 of the memory hub 40. The return spring 42 may exert a biasing force on the memory hub 40 that may rotate the memory hub 40 in a direction that allows the wedges 194 to enter the recesses 142 in the memory plate 34.

Referring to FIGS. 3, 4, 6 and 7, the cam disc 44 may be fixedly disposed on the cam 28. The cam disc 44 may be axially positioned between the first plate 20 and the memory plate 34. The cam disc 44 may extend around the axis 18 and may be disposed substantially perpendicular to the axis 18 in one or more embodiments. The cam disc 44 may be configured to actuate the set of pawls 32 when the cam disc 44 is rotated about the axis 18 as will be discussed in more detail below. As is best shown in FIGS. 6 and 7, the cam disc 44 may include a center hole 210 and a plurality of pawl actuation openings 212.

The center hole 210 may be disposed proximate the axis 18. The center hole 210 may be configured to mate with the cam lobes 84 of the cam 28 such that the cam disc 44 rotates with the cam 28.

The pawl actuation openings 212 may be configured to guide movement of the pawls 32 when the cam disc 44 is rotated about the axis 18 by the cam 28. More specifically, the pawl pin 94 of each pawls 32 may be configured to slide within a corresponding pawl actuation opening 212 such that at least one surface that defines the pawl actuation opening 212 may exert force on the pawl pin 94 and guide movement of the pawl 32 toward the axis 18. As such, the pawls 32 may be retracted toward the axis 18 when the cam disc 44 rotates about the axis 18 in a first direction. In addition, the pawls 32 may be permitted to extend away from the axis 18 when the cam disc 44 rotates in a second direction, provided that outward movement of the pawls 32 is not inhibited by the memory plate 34 as will be discussed in more detail below. Each pawl actuation opening 212 may have a curved outer edge that may become progressively closer to the axis 18 to retract a corresponding pawl 32 when the cam disc 44 is rotated in the first direction. In FIGS. 6 and 7, two of the pawl actuation openings 212 are contiguous with the center hole 210 and two pawl actuation openings 212 are completely spaced apart from and not contiguous with the center hole 210.

Referring to FIGS. 3, 8 and 9, the handle 46 may be disposed adjacent to the second plate 22. For example, the handle 46 may be disposed outside the second plate 22 and may be mounted on the memory hub 40. The handle 46 may be fixedly disposed on the memory hub 40. As such, the handle 46 may rotate the memory hub 40 about the axis 18.

As is best shown in FIGS. 8 and 9, the handle 46 may include a handle hole 220, a pocket 222, and an arm 224.

The handle hole 220 may extend through the handle 46 and may extend around the axis 18. The handle hole 220 may have a configuration that may mate with the tabs 190 of the memory hub 40 such that the handle 46 does not rotate with respect to the memory hub 40.

The pocket 222 may extend around a portion of the handle hole 220. The pocket 222 may face away from the second plate 22 and may receive the clip 48.

The arm 224 may extend away from the axis 18. The arm 224 may be operatively connected to an actuator, such as a remotely located release handle like an easy entry release handle that may be disposed on the seat back 14. The arm 224 may be connected to the release handle by a linkage, such as a cable.

Referring to FIGS. 2 and 3, the clip 48 may secure the hub 38 and the handle 46 to the recliner mechanism 16. The clip 48 may configured as a ring that may be disposed on the clip retaining feature 176 of the hub 38 and received in the pocket 222 of the handle 46. As such, the clip 48 may inhibit axial movement of the hub 38 and the handle 46 while permitting the hub 38 and the handle 46 to rotate about the axis 18.

Referring to FIGS. 10A through 13, operation of the recliner mechanism 16 will now be described in more detail.

Figure 10B:
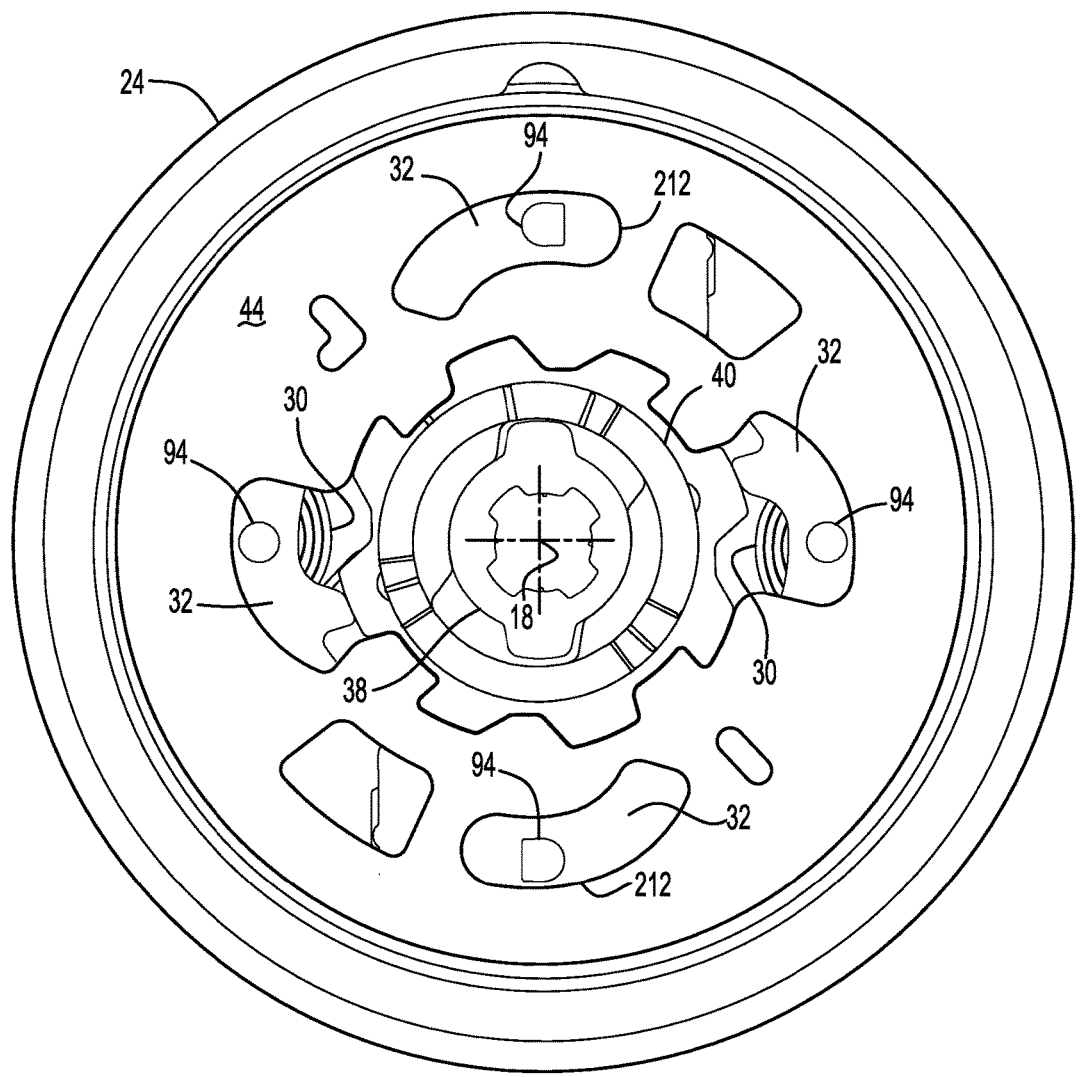
Figure 10C:
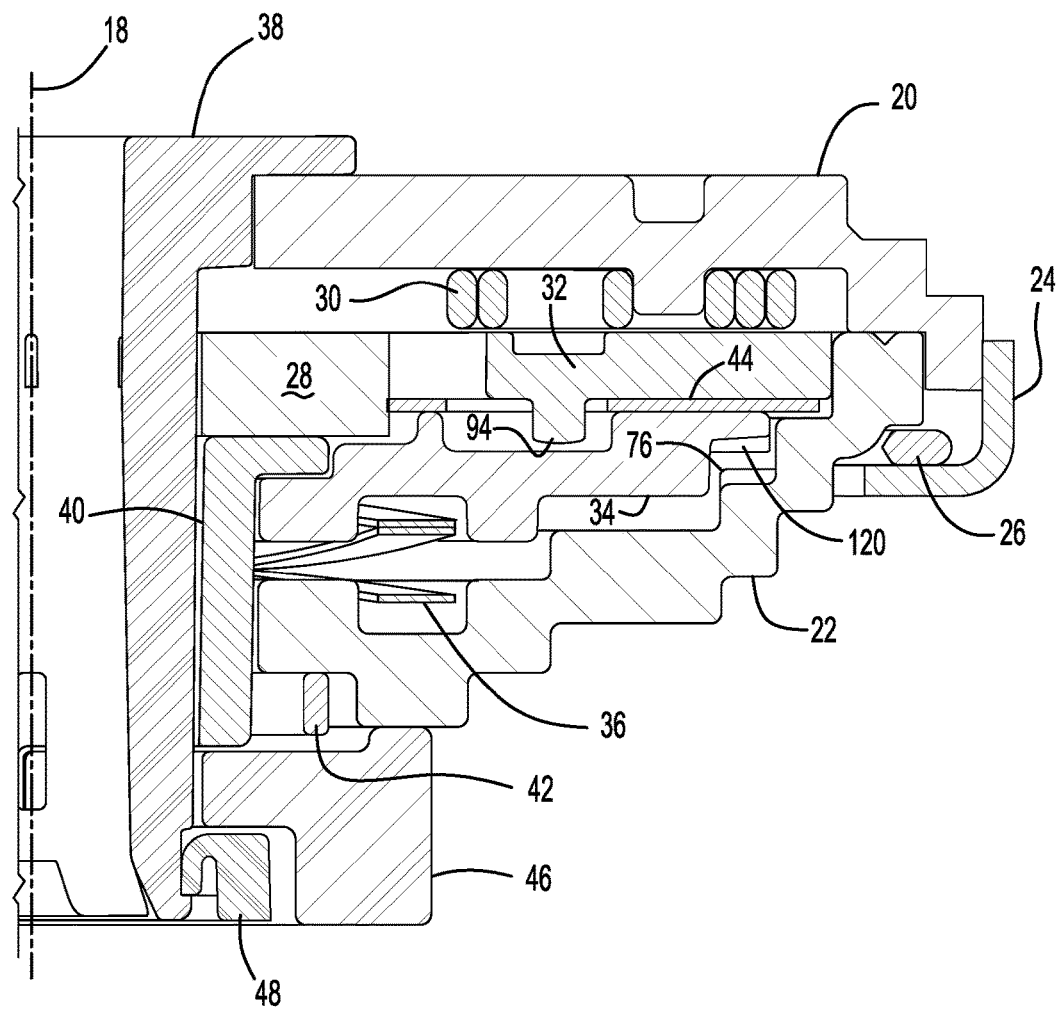
Figure 10D:
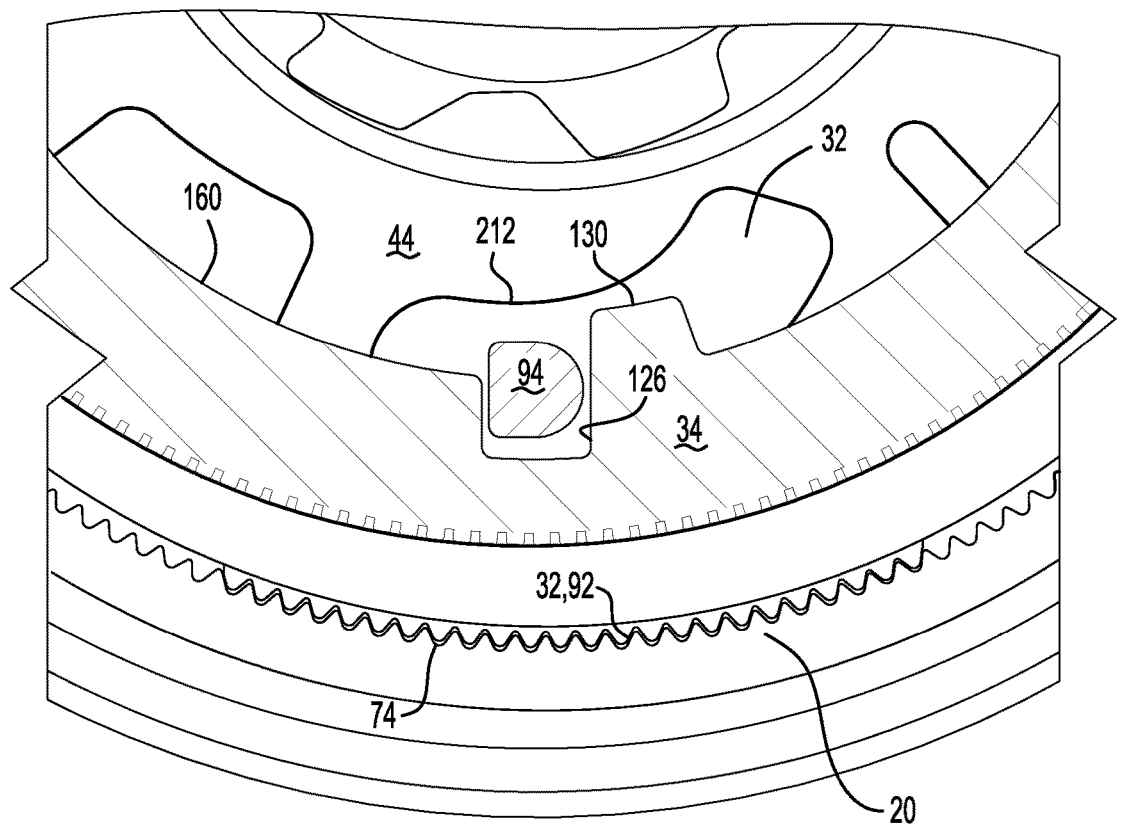

In FIGS. 10A-10D, the recliner mechanism 16 is shown in an initial position in which the pawls 32 are in the extended position. In the extended position the pawls 32 may engage teeth 74 on the second plate 22, thereby inhibiting rotation of the second plate 22 and the seat back 14 about the axis 18 and with respect to the seat bottom 12 and the first plate 20. In addition, the memory plate 34 is shown in the unlocked position, which is best shown in FIG. 10C. In the unlocked position the memory plate teeth 120 may be disengaged from the locking protrusions 76 on the second plate 22 due to the biasing force exerted by the memory plate biasing member 36. The memory hub 40 may be positioned such that the wedges 194 on the memory hub 40 are aligned with and received in the recesses 142 on the memory plate 34. As shown in FIG. 10D, each D-shaped pawl pins 94 may be received in a corresponding memory slot 126.

Figure 11A:
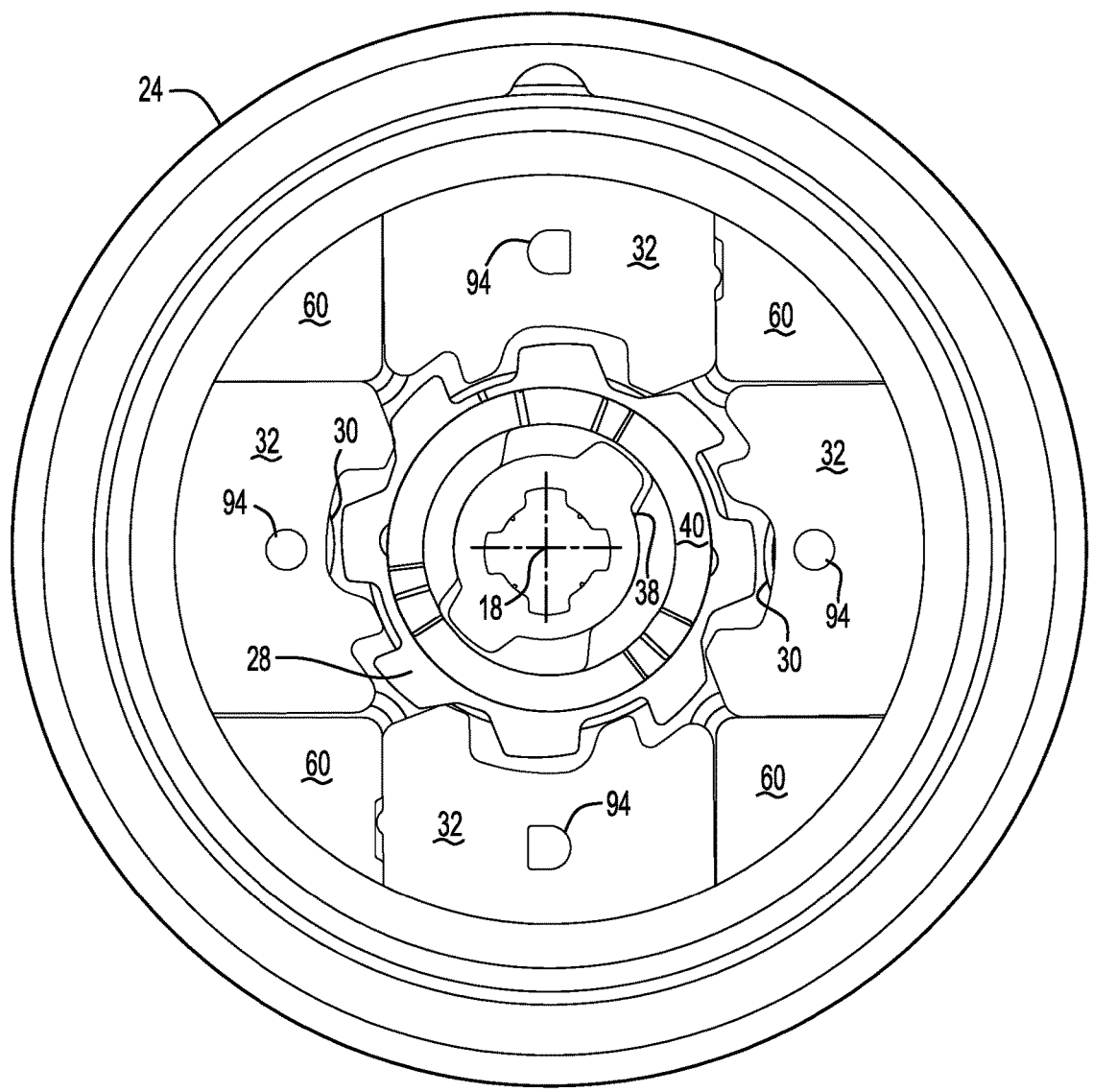
FIGS. 11A-11D illustrate movement of the pawls from the extended position to a retracted position.
Figure 11B:
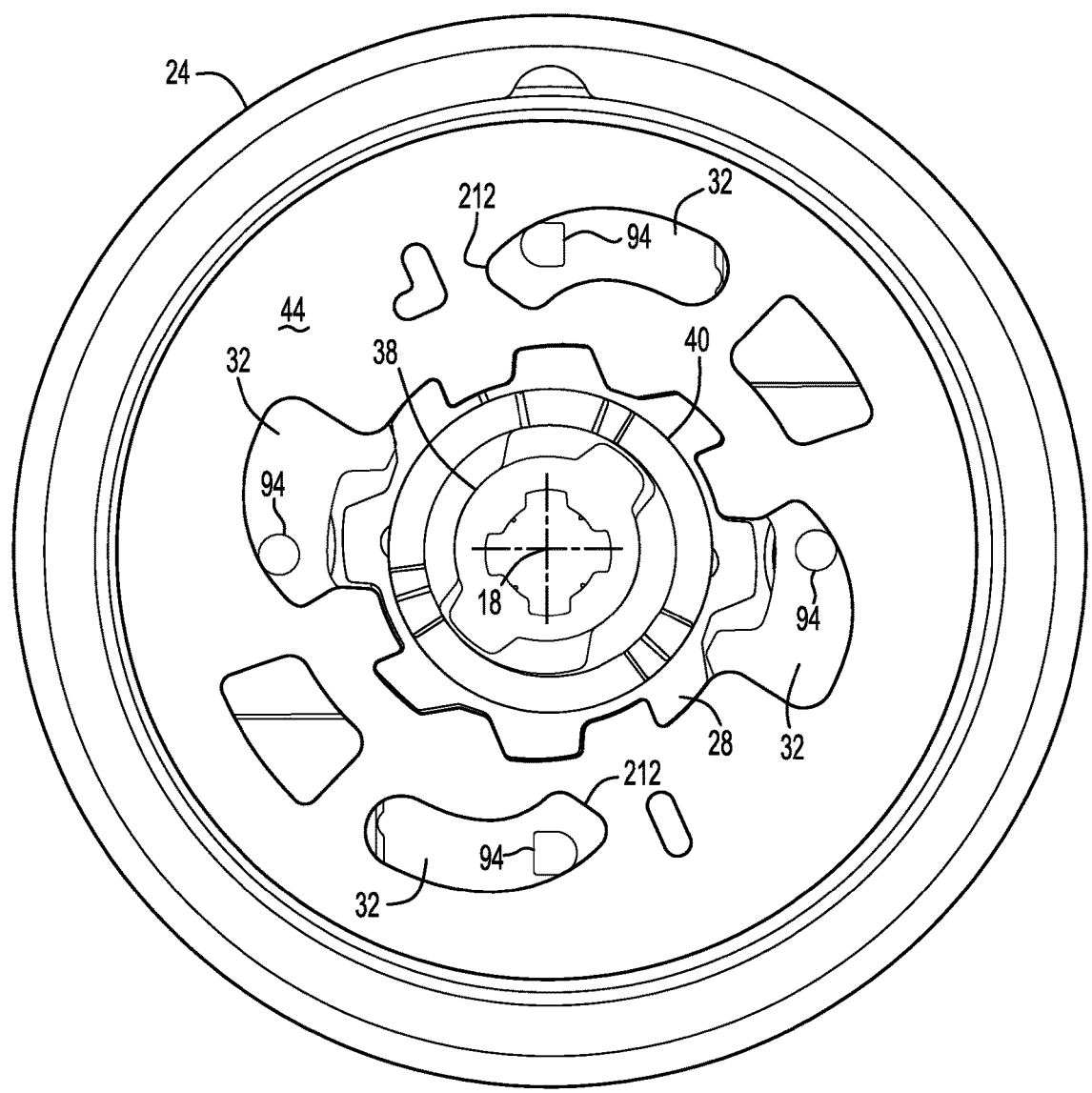
Figure 11C:
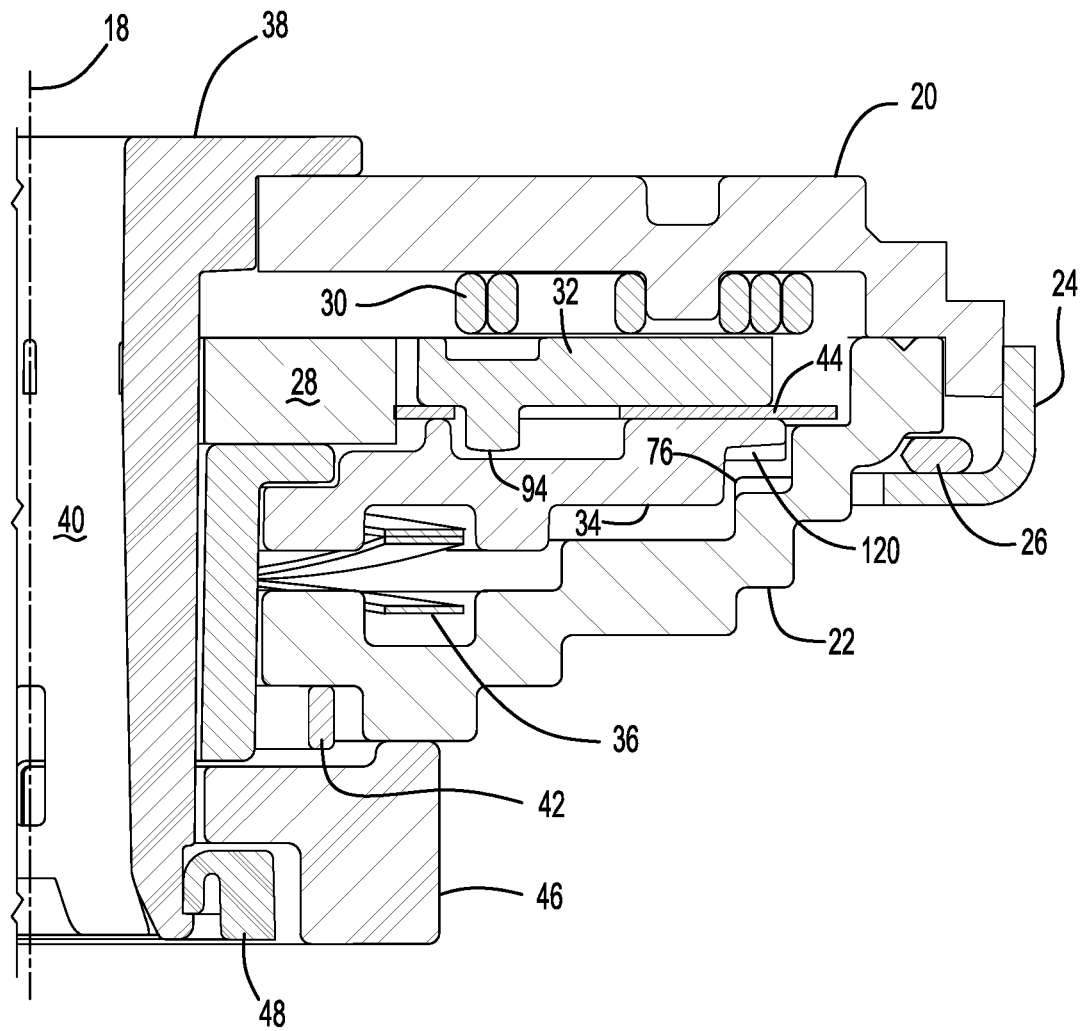
Figure 11D:
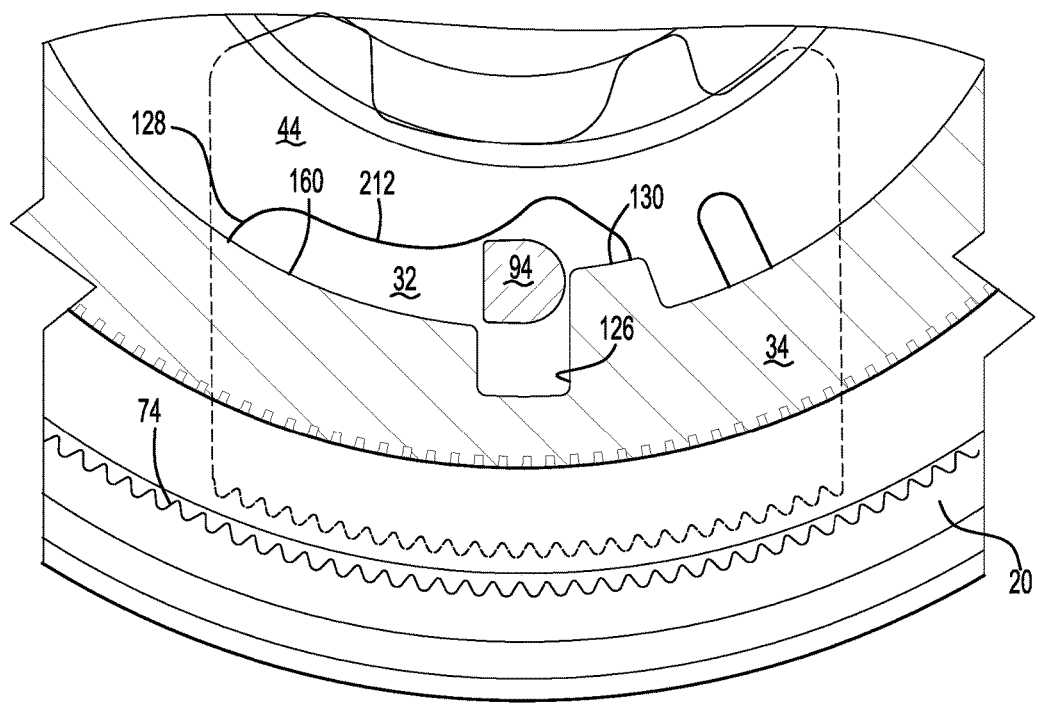

Referring to FIGS. 11A-11D, the angular position of the seat back 14 with respect to the seat bottom 12 may be changed by rotating the hub 38 about the axis 18 to retract the pawls 32. For example, the seat back 14 may be reclined (i.e., tilted backward and away from the seat bottom 12) or inclined to a different angular position by rotating the hub 38 about the axis 18 in a first direction, such as a clockwise direction from the position shown in FIGS. 10A-10D. This is best shown by comparing the position of the hub 38 in FIGS. 10A and 11A. Rotating the hub 38 in a first direction may rotate the cam 28 and the cam disc 44 in the first direction as is best shown in FIGS. 10A and 10B. Rotation of the cam disc 44 in the first direction may cause the pawls 32 to move from the extended position to a retracted position in which the pawls 32 are retracted toward the axis 18 and disengage the teeth 74 on the second plate 22 as is best shown in FIG. 11D. More specifically, rotation of the cam disc 44 may rotate the pawl actuation openings 212, which in turn may exert force on the pawl pins 94. In response, a pawl pin 94 may slide along the edge of a corresponding pawl actuation opening 212. Accordingly, the cam disc 44 may actuate the pawls 32 toward the axis 18 as the pawl actuation openings 212 move closer to the axis 18.

Rotation of the hub 38 may occur without rotating the memory hub 40, as is best shown by comparing FIGS. 10A and 11A and 10B and 11B.

Rotation of the hub 38 may also occur without actuating the memory plate 34 from the unlocked position to the locked position as is best shown in FIG. 11C. As such, the D-shaped pawl pins 94 may move in the memory slot 126 of the memory plate 34 toward the axis 18 as is best shown in FIG. 11D. The D shaped pawl pins 94 may not enter the memory guide 128 of the memory plate 34 due to the depth differences between the memory slot 126 and the memory guide 128. More specifically, the D-shaped pawl pins 94 may not exit the memory slot 126 and enter the memory guide 128 when the memory plate 34 is in the unlocked position due to the length of the D-shaped pawl pins 94. The D shaped pawl pins 94 may have an axial length that extends past the bottom surface of the memory guide 128 (i.e., deeper into the memory plate 34 than the bottom surface) when the memory plate 34 is in the unlocked position. As such, the D-shaped pawl pins 94 may engage a step surface 230, which is best shown in FIG. 7, which extends from the bottom of the memory slot 126 to the bottom of the memory guide 128, thereby retaining the D-shaped pawl pins 94 in their corresponding memory slots 126.

The angular position of the seat back 14 may be adjusted once the pawls 32 disengage the teeth 74 on the second plate 22. For example, the angular position of the seat back 14 (and hence the second plate 22) may be adjusted by exerting force on the seat back 14 to rotate the seat back 14 about the axis 18 to a desired angular position.

Once the desired angular position has been obtained, the hub 38 may be released to allow the hub 38, cam 28, and cam disc 44 to rotate in a second direction or opposite direction under the biasing force exerted by the cam springs 30. In response, the cam 28 may urge the pawls 32 to move from the retracted position back to the extended position so that the pawls 32 may engage the teeth 74 on the second plate 22 to hold the seat back 14 in the desired angular position.

Figure 12A:
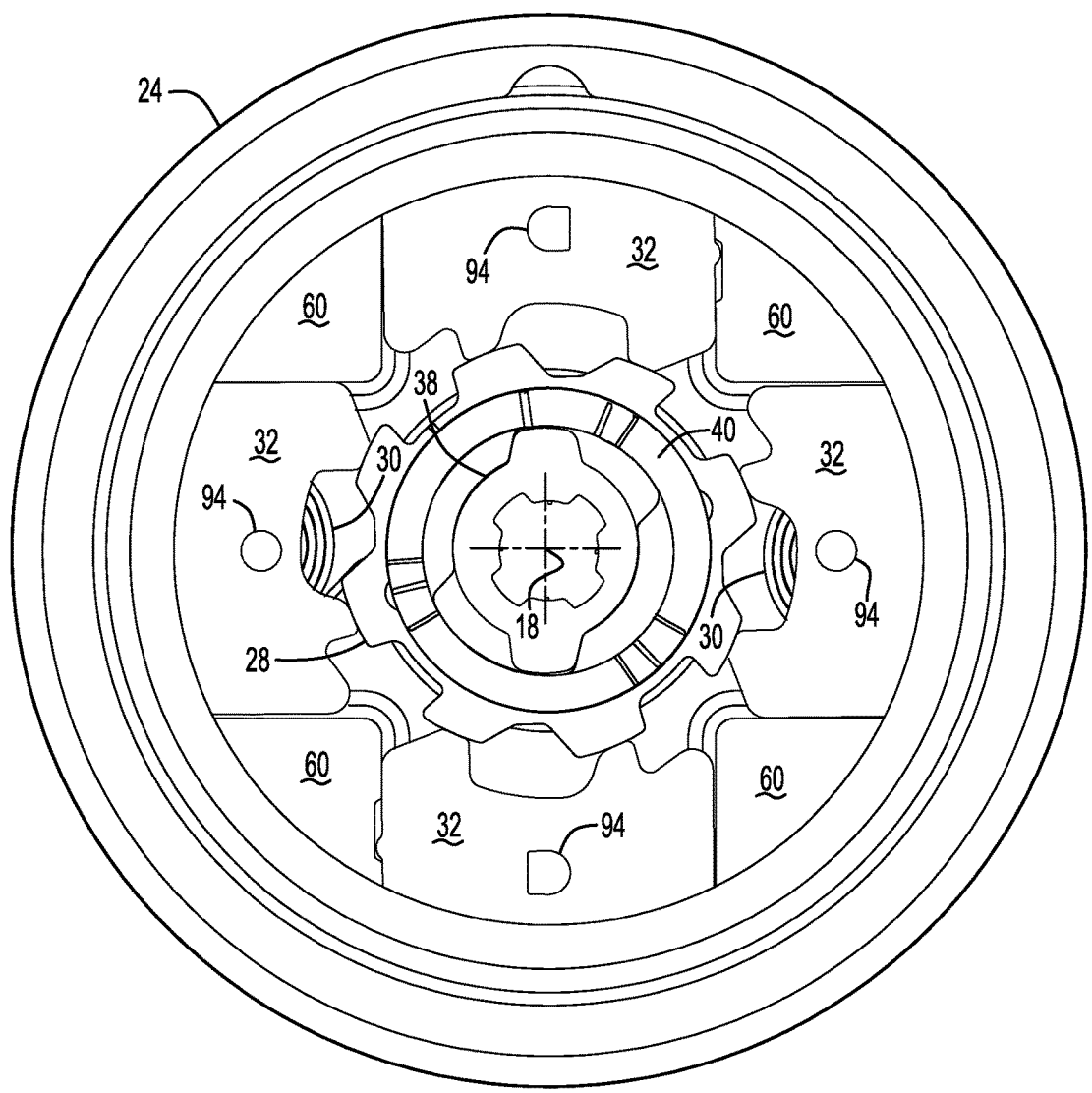
FIGS. 12A and 12B illustrate actuation of the memory plate from the unlocked position to the locked position.
Figure 12B:
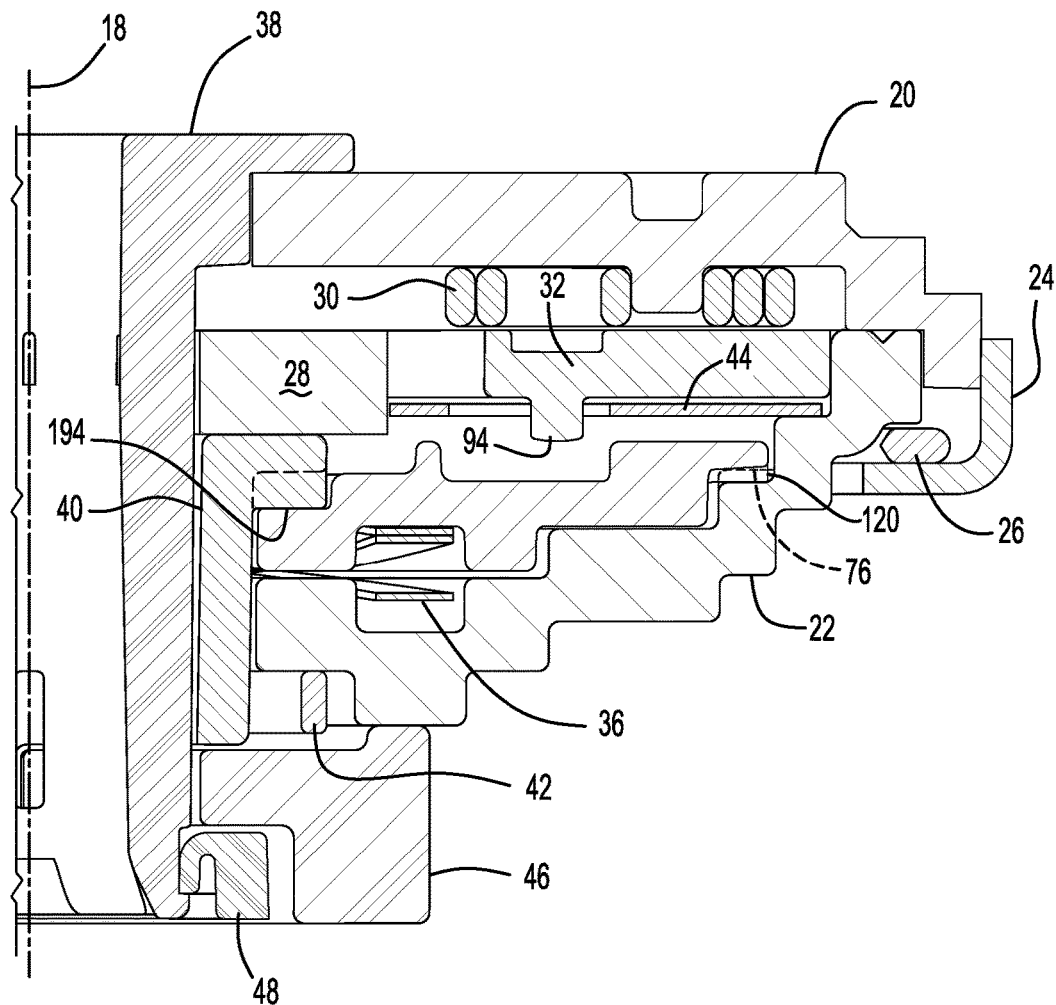

Referring to FIGS. 12A and 12B, the memory and dump functionality of the recliner mechanism 16 will now be discussed. Dump functionality may allow the seat back 14 to freely fold or "dump" forward over the seat bottom 12, such as by keeping the pawls 32 in the retracted position as the seat back 14 rotates from an initial position to the folded position. Memory functionality may allow the seat back 14 to return to its previous angular position before the dump was executed. Memory and dump functionality may be employed as part of an easy entry system in which the seat back 14 may be dumped over the seat bottom 12 while the seat bottom 12 is permitted to slide forward in the vehicle to provide additional room to access a rear seat that may be disposed behind the seat assembly.

Referring to FIG. 12A, memory functionality may be set by rotating the memory hub 40 about the axis 18 in the first direction with respect to the position shown in FIG. 10A. The memory hub 40 may rotate about the axis 18 over a predetermined angular distance without rotating the hub 38. The wedges 194 may exit the recesses 142 in the memory plate 34 and may slide up the recess ramp surfaces 152 to the face 140 when the memory hub 40 is rotated over the predetermined angular distance. The force exerted by the wedges 194 may overcome the biasing force of the memory plate biasing member 36 and the memory plate 34 may move axially toward the second plate 22 such that the memory plate teeth 120 mate with the locking protrusions 76 on the second plate 22 as is best shown in FIG. 12B. Accordingly, the memory plate 34 may now rotate with the second plate 22 about the axis 18.

Axial movement of the memory plate 34 toward the second plate 22 may move the bottom of the memory guide 128 further away from the pawls 32, thereby providing sufficient clearance to allow the D-shaped pawl pins 94 to exit there corresponding memory slots 126 when the seat back 14 and second plate 22 are rotated about the axis 18. The stops 130 on the memory plate 34 may inhibit rotation of the seat back 14 and the second plate 22 toward a reclined position or away from the seat bottom 12. More specifically, the stops 130 may engage the D shaped pawl pins 94 and inhibit rotation toward a reclined position.

Further rotation of the memory hub 40 in the first direction may cause the memory hub 40 to rotate the hub 38. More specifically, further rotation of the memory hub 40 may rotate the memory hub 40 into engagement with the engagement features 172 of the hub 38. As such, this further rotation of the memory hub 40 may in turn rotate the hub 38 in the first direction. In response, the pawls 32 may move from the extended position toward the retracted position as previously discussed.

Figure 13:
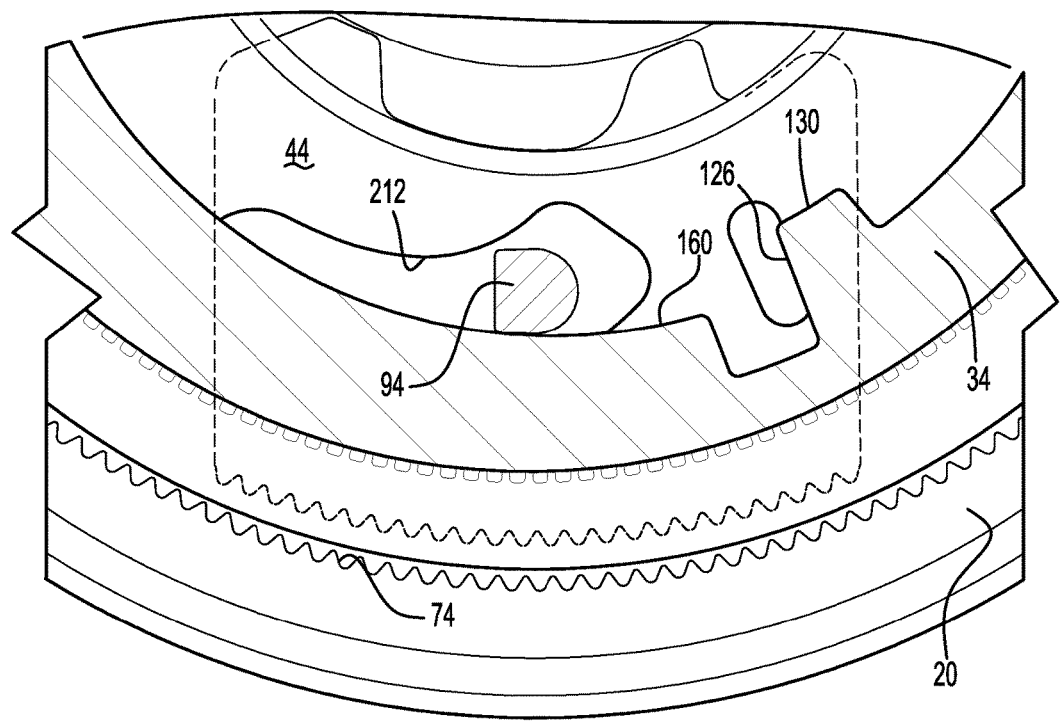
FIG. 13 illustrates rotation of the seat back and the second plate after actuating the memory plate to the locked position.

Referring to FIG. 13, rotation of the seat back 14 and second plate 22 toward the dump position is shown. The second plate 22 and the memory plate 34 rotate with the seat back 14 when the seat back 14 is folded forward over the seat bottom 12. More specifically, the memory plate 34 rotates with the second plate 22 due to engagement of the memory plate teeth 120 and the locking protrusions 76. The D-shaped pawl pins 94 may exit their corresponding memory slots 126 and enter the memory guide 128. The memory guide wall 160 may engage the pawl pins 94 and hold the pawls 32 in the retracted position. Accordingly, the memory guide 128 inhibits the pawls 32 from moving to the extended position.

The seat back 14 may be returned to its initial angular position by reversing the steps previously discussed. More specifically the seat back 14 may be rotated in a second direction about the axis 18 when the seat back 14 moves away from the seat bottom 12. The second plate 22 and the memory plate 34 may rotate in the second direction with the seat back 14. Sufficient rotation may cause the D-shaped pawl pins 94 to exit the memory guide 128 and enter their corresponding memory slots 126. The pawls 32 may then be free to move from the retracted position to the extended position to lock the angular position of the seat back 14. The memory hub 40 may then rotate with respect to the hub 38 back to its initial position in response to the biasing force exerted by the return spring 42 and/or by interaction with the hub 38 and cam 28 under the biasing force or assistance of the cam springs 30. Rotation of the memory hub 40 may allow the wedges 194 to slide down the recess ramp surfaces 152 into the recesses 142. The memory plate 34 may then move axially away from the second plate 22 such that the memory plate teeth 120 disengage the locking protrusions 76.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
a first plate;
a second plate that is rotatable about an axis with respect to the first plate, the second plate having a set of teeth and a set of locking protrusions;
a set of pawls that are moveable between an extended position in which the pawls engage the teeth to inhibit rotation of the second plate with respect to the first plate and a retracted position in which the pawls do not engage the teeth to permit rotation of the second plate with respect to the first plate; and
a memory plate that is disposed between the first plate and the second plate and that is moveable along the axis, the memory plate having a set of memory plate teeth, wherein the memory plate holds the pawls in the retracted position when the memory plate is actuated toward the second plate and the memory plate teeth engage the locking protrusions.

2. The recliner mechanism of claim 1 wherein a set of locking protrusions face toward the first plate and the set of teeth face toward the axis are disposed substantially perpendicular to the locking protrusions.

3. The recliner mechanism of claim 1 wherein the memory plate is received inside the second plate and the set of teeth is disposed further from the axis than the locking protrusions and the memory plate.

4. The recliner mechanism of claim 1 wherein the memory plate moves in an axial direction away from the set of teeth when the memory plate is actuated toward the second plate.

5. The recliner mechanism of claim 4 further comprising a memory plate biasing member that is disposed between the second plate and the memory plate, wherein the memory plate biasing member urges the memory plate to move axially toward the first plate.

6. A recliner mechanism comprising:
a first plate;
a second plate that is rotatable about an axis with respect to the first plate, the second plate having a set of teeth and a set of locking protrusions;
a set of pawls that are moveable between an extended position in which the pawls engage the teeth to inhibit rotation of the second plate with respect to the first plate and a retracted position in which the pawls do not engage the teeth to permit rotation of the second plate with respect to the first plate;
a memory plate that is disposed between the first plate and the second plate, wherein the memory plate holds the pawls in the retracted position when the memory plate is actuated in an axial direction toward the second plate and into engagement with the locking protrusions;
a hub that actuates the pawls; and
a memory hub that actuates the memory plate, wherein the hub and the memory hub are independently rotatable about the axis.

7. The recliner mechanism of claim 6 wherein the hub extends through the memory hub.

8. The recliner mechanism of claim 6 wherein the memory hub has a flange that extends away from the axis and a wedge is disposed on the flange and extends toward the memory plate, wherein the wedge engages the memory plate and actuates the memory plate toward the second plate.

9. The recliner mechanism of claim 8 wherein the flange extends around the hub and is axially positioned between the first plate and the memory plate.

10. The recliner mechanism of claim 9 wherein the memory plate has memory plate teeth and a center ring that defines a center hole that receives the memory hub, the center ring including a face and a recess that is axially offset from the face, wherein the memory plate engages the locking protrusions when the wedge is disposed on the face and the memory plate teeth is disengaged from the locking protrusions when the wedge is disposed in the recess.

11. The recliner mechanism of claim 10 wherein the recess has a bottom recess surface and the wedge has a wedge face surface, wherein the wedge face surface is disposed adjacent to the bottom recess surface when the memory plate teeth are disengaged from the locking protrusions and the wedge face surface is disposed on the face of the center ring when the memory plate teeth engage the locking protrusions.

12. The recliner mechanism of claim 11 wherein the recess has a recess ramp surface that extends from the bottom recess surface to the face and the wedge has a wedge ramp surface that extends from the wedge face surface, wherein the wedge ramp surface slides along the recess ramp surface when the memory plate moves axially with respect to the second plate.

13. A recliner mechanism comprising:
a first plate;
a second plate that is rotatable about an axis;
a pawl that is disposed between the first plate and the second plate and that has a pawl pin that extends toward the second plate, wherein the pawl is moveable in a radial direction between an extended position in which the pawl inhibits rotation of the second plate about the axis and a retracted position in which the pawl does not engage the second plate and the second plate is rotatable about the axis; and
a memory plate that has a first side that faces toward the first plate and that has a memory guide and a memory slot that extends from the memory guide, wherein the pawl is moveable between the retracted position and the extended position when the pawl pin is disposed in the memory slot and the pawl is held in the retracted position when the pawl pin is received in the memory guide.

14. The recliner mechanism of claim 13 wherein the memory slot extends radially with respect to the axis.

15. The recliner mechanism of claim 14 wherein the memory guide has a memory guide wall that is disposed at a radial distance from the axis, wherein the pawl is held in the retracted position when the pawl pin is disposed on the memory guide wall.

16. The recliner mechanism of claim 15 wherein the pawl pin is moveable between the memory slot and the memory guide when the memory plate is actuated along the axis into engagement with the second plate.

17. The recliner mechanism of claim 16 wherein the pawl pin is prevented from moving from the memory slot into the memory guide when the memory plate is axially positioned such that the memory plate does not engage the second plate.

18. The recliner mechanism of claim 15 wherein a second side of the memory plate that is disposed opposite the first side has an outer ring, the memory guide is recessed in an axial direction from the outer ring, and the memory slot is recessed in the axial direction from the memory guide.

19. The recliner mechanism of claim 18 wherein the outer ring further comprises a stop that extends inward toward the axis, wherein the pawl pin engages the stop to inhibit rotation of the memory plate with respect to the first plate.

20. The recliner mechanism of claim 19 wherein the memory guide is a recess that extends continuously around the axis.

\* \* \* \* \*